US012688612B2

(12) United States Patent
Mao et al.

(10) Patent No.: US 12,688,612 B2
(45) Date of Patent: Jul. 21, 2026

(54) DATA PROCESSING METHOD AND APPARATUS, DEVICE, AND STORAGE MEDIUM

(71) Applicant: Tencent Technology (Shenzhen) Company Limited, Shenzhen (CN)

(72) Inventors: Shuyuan Mao, Shenzhen (CN); Shenzhou Chen, Shenzhen (CN); Jiayao Ma, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 19/050,748

(22) Filed: Feb. 11, 2025

(65) Prior Publication Data

US 2025/0182333 A1     Jun. 5, 2025

Related U.S. Application Data

(63) Continuation of application No. PCT/CN2023/127836, filed on Oct. 30, 2023.

(30) Foreign Application Priority Data

Feb. 10, 2023     (CN) ......................... 202310127541.X

(51) Int. Cl.
G06T 7/80          (2017.01)
G06T 7/13          (2017.01)
(52) U.S. Cl.
CPC .................. G06T 7/80 (2017.01); G06T 7/13 (2017.01); *G06T 2207/30241* (2013.01)

(58) Field of Classification Search
CPC .. G06T 7/80; G06T 7/70; G06T 7/246; G06T 7/13; G06T 7/012; G06T 2207/10016; G06T 2207/30204; G06T 2207/30241; G06T 2207/30244; G06F 1/16; G06F 1/163
See application file for complete search history.

(56) References Cited

U.S. PATENT DOCUMENTS

| | | | | |
|---|---|---|---|---|
| 10,089,753 | B1 * | 10/2018 | Fegyver | G06T 7/73 |
| 10,380,761 | B2 * | 8/2019 | Liu | G01S 5/16 |
| 2017/0124928 | A1 * | 5/2017 | Edwin | G01B 11/22 |
| 2019/0158813 | A1 * | 5/2019 | Rowell | H04N 13/111 |
| 2019/0266753 | A1 * | 8/2019 | Dworakowski | G06T 7/73 |

(Continued)

*Primary Examiner* — Ariel A Balaoing

(74) *Attorney, Agent, or Firm* — ARENTFOX SCHIFF LLP

(57)          ABSTRACT

In a data processing method, at least one calibration target image captured by camera of a head mounted display device is obtained. At least one corner point is determined from the at least one calibration target image. Projection coordinates of first coordinates of each corner point in a calibration target coordinate system to an image coordinate system are determined. Second coordinates of each corner point in the image coordinate system and an offset distance between the projection coordinates and the second coordinates of the respective corner point are determined. A second movement trajectory of the camera in the world coordinate system within the preset time period is determined based on a first transformation matrix and a first movement trajectory. A pose estimation parameter of the head mounted display device is adjusted based on the second movement trajectory.

20 Claims, 8 Drawing Sheets

(56)  References Cited

U.S. PATENT DOCUMENTS

| | | | |
|---|---|---|---|
| 2020/0209628 A1* | 7/2020 | Sztuk ................. | G02B 27/0172 |
| 2021/0124174 A1* | 4/2021 | Tokunaga ............ | H04N 17/002 |
| 2021/0215940 A1* | 7/2021 | Freese ....................... | G06T 7/90 |
| 2024/0161340 A1* | 5/2024 | Aleem ................... | H04N 23/66 |
| 2026/0003452 A1* | 1/2026 | Chen ....................... | G06F 3/038 |

* cited by examiner

Head display device
11

Camera 12

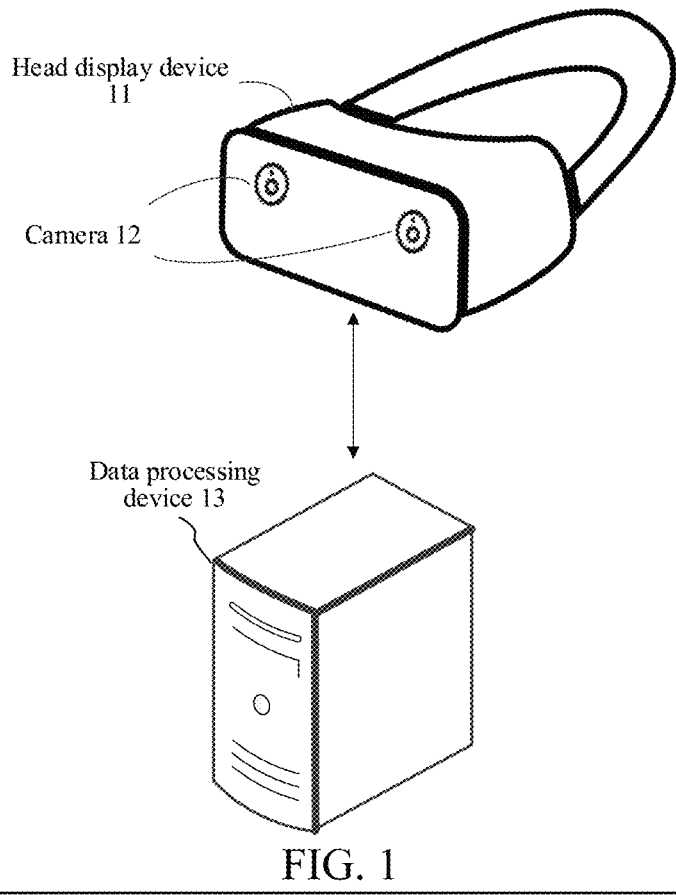

Data processing
device 13

FIG. 1

| Obtain at least one calibration target image determined by a head display device in a process in which the head display device moves in a motion capture area | S21 |

| Determine at least one corner point from the at least one calibration target image, and determine projection coordinates of first coordinates of each corner point in a calibration target coordinate system to an image coordinate system in which the corner point is located | S22 |

| Determine second coordinates of each corner point in the image coordinate system and an offset distance between the projection coordinates and the second coordinates of each corner point, and determine, based on the offset distance corresponding to each corner point, a first transformation matrix from an object coordinate system in which a motion capture object is located to a camera coordinate system corresponding to a first camera | S23 |

| Determine, based on the first transformation matrix and a first movement trajectory of the motion capture object in a world coordinate system when the head display device moves within a preset time period, a second movement trajectory of the first camera in the world coordinate system within the preset time period, and adjust a pose estimation parameter of the head display device based on the second movement trajectory | S24 |

FIG. 2

Corner point

Checkerboard (tag)

Calibration target

Y

Calibration target image

Calibration target

X

O

Z

DATA PROCESSING METHOD AND APPARATUS, DEVICE, AND STORAGE MEDIUM

RELATED APPLICATIONS

The present application is a continuation of International Application No. PCT/CN2023/127836, filed on Oct. 30, 2023, and entitled "DATA PROCESSING METHOD AND APPARATUS, DEVICE, AND STORAGE MEDIUM," which claims priority to Chinese Patent Application No. 202310127541.X, filed on Feb. 10, 2023 and entitled "DATA PROCESSING METHOD AND APPARATUS, DEVICE, AND STORAGE MEDIUM." The entire disclosures of the prior applications are hereby incorporated by reference.

FIELD OF THE TECHNOLOGY

This disclosure relates to the field of computer technologies, including to a data processing method and apparatus, a device, and a storage medium.

BACKGROUND OF THE DISCLOSURE

Extended reality (XR) refers to technologies that bring immersion of seamless conversion between a virtual world and a real world to an experiencer in a new human-computer interaction manner and by creating, through a modern high-technology means in which a computer serves as a core, a digital environment in which reality and virtuality are combined. As the XR technologies become increasingly mature, the XR technologies impose higher requirements on a display terminal (such as a head display device) in aspects such as determining pose information.

In the field of XR technologies, a head display device needs to constantly adjust a pose estimation parameter, to improve evaluation precision of six degrees of freedom (DoFs) (which are rotation and translation of three coordinate axes) of a camera on the head display device, so that the head display device has a better display effect. In the related art, when the pose estimation parameter of the head display device is adjusted, a movement trajectory of the camera on the head display device usually needs to be first determined, and then the movement trajectory is evaluated through hand-eye calibration, to adjust the pose estimation parameter of the head display device based on an evaluation result. However, the determined trajectory of the camera has an error, and the error may act on the hand-eye calibration, causing a larger error in the evaluation result of the movement trajectory. As a result, the pose estimation parameter of the head display device cannot be effectively adjusted.

SUMMARY

Embodiments of this disclosure provide a data processing method and apparatus, a device, and a storage medium, to more accurately adjust a pose estimation parameter of a head display device, and applicability is high.

According to an aspect, an embodiment of this disclosure provides a data processing method. In the data processing method, at least one calibration target image captured by a camera of a head mounted display device is obtained in a process in which the head mounted display device moves in a motion capture area. At least one corner point is determined from the at least one calibration target image. Projection coordinates of first coordinates of each of the at least one corner point in a calibration target coordinate system to an image coordinate system in which the respective corner point is located are determined. Second coordinates of each of the at least one corner point in the image coordinate system and an offset distance between the projection coordinates and the second coordinates of the respective corner point are determined. Based on the offset distance corresponding to each of the at least one corner point, a first transformation matrix from an object coordinate system in which a motion capture object is located to a camera coordinate system corresponding to the camera is determined. The motion capture object is attached to the head mounted display device. Based on the first transformation matrix and a first movement trajectory of the motion capture object in a world coordinate system when the head mounted display device moves within a preset time period, a second movement trajectory of the camera in the world coordinate system within the preset time period is determined. A pose estimation parameter of the head mounted display device is adjusted based on the second movement trajectory.

According to another aspect, an embodiment of this disclosure provides a data processing apparatus, including processing circuitry.

The processing circuitry is configured to processing circuitry configured to obtain at least one calibration target image captured by a camera of a head mounted display device in a process in which the head mounted display device moves in a motion capture area. The processing circuitry is configured to determine at least one corner point from the at least one calibration target image. The processing circuitry is configured to determine projection coordinates of first coordinates of each of the at least one corner point in a calibration target coordinate system to an image coordinate system in which the respective corner point is located. The processing circuitry is configured to determine second coordinates of each of the at least one corner point in the image coordinate system and an offset distance between the projection coordinates and the second coordinates of the respective corner point. The processing circuitry is configured to determine, based on the offset distance corresponding to each of the at least one corner point, a first transformation matrix from an object coordinate system in which a motion capture object is located to a camera coordinate system corresponding to the camera, the motion capture object being attached to the head mounted display device. The processing circuitry is configured to determine, based on the first transformation matrix and a first movement trajectory of the motion capture object in a world coordinate system when the head mounted display device moves within a preset time period, a second movement trajectory of the camera in the world coordinate system within the preset time period. The processing circuitry is configured to adjust a pose estimation parameter of the head mounted display device based on the second movement trajectory.

According to another aspect, an embodiment of this disclosure provides an electronic device, including a processor and a memory, the processor being connected to the memory.

The memory is configured to store a computer program.

The processor is configured to perform, when invoking the computer program, the data processing method provided in the embodiments of this disclosure.

According to another aspect, an embodiment of this disclosure provides a computer-readable storage medium, storing a computer program. The computer program is executed by a processor to implement the data processing method provided in the embodiments of this disclosure.

According to another aspect, an embodiment of this disclosure provides a computer program product, including a computer program. When the computer program is executed by a processor, the data processing method provided in the embodiments of this disclosure is implemented.

In this embodiment of this disclosure, after the projection coordinates of the coordinates of each corner point in the calibration target image in the calibration target coordinate system to the image coordinate system are determined, the first transformation matrix from the object coordinate system to the camera coordinate system corresponding to the first camera on the head display device may be determined based on the offset distance between the projection coordinates of each corner point and the coordinates of the corner point in the image coordinate system. Based on this, not only an impact of an error caused by a restored movement trajectory of the first camera when the first transformation matrix is determined based on the restored movement trajectory can be avoided, but also efficiency of determining the first transformation matrix can be effectively improved.

Further, the movement trajectory of the motion capture object on the head display device within the preset time period may be converted into an actual movement trajectory of the first camera within the preset time period by using the first transformation matrix, so that the pose estimation parameter of the head display device can be accurately adjusted based on the actual movement trajectory of the first camera, to help improve accuracy of predicting six degrees of freedom of the first camera by the head display device, and improve a display effect of the head display device.

BRIEF DESCRIPTION OF THE DRAWINGS

To describe the technical solutions in embodiments of this disclosure more clearly, the accompanying drawings are briefly described below. The accompanying drawings in the following descriptions are merely some embodiments of this disclosure, and a person of ordinary skill in the art may further derive other drawings based on the accompanying drawings.

FIG. 1 is a schematic diagram of a scenario in which a head display device is used according to an embodiment of this disclosure.

FIG. 2 is a schematic flowchart of a data processing method according to an embodiment of this disclosure.

DESCRIPTION OF EMBODIMENTS

Figure 3A:
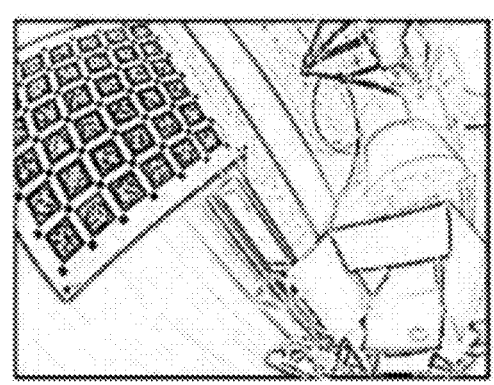
FIG. 3a to FIG. 3d are schematic diagrams of a calibration target image according to an embodiment of this disclosure.
Figure 3B:
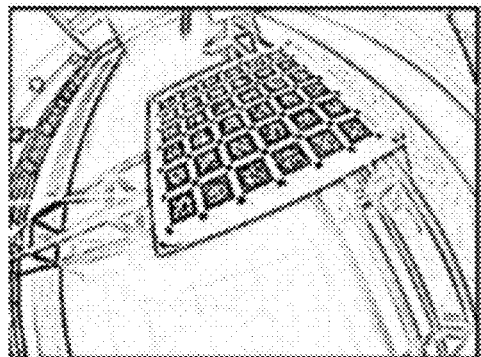
Figure 3C:
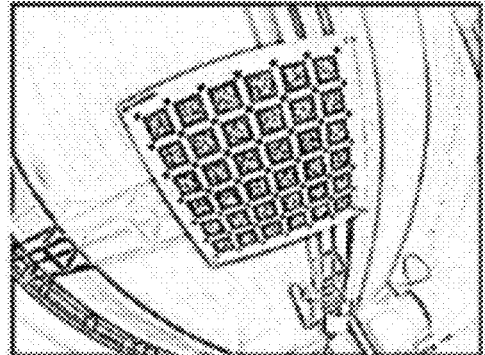
Figure 3D:
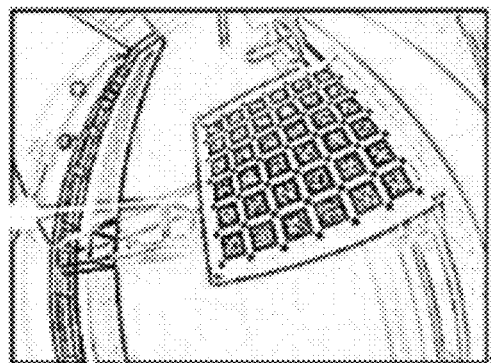

The technical solutions in embodiments of this disclosure are described below with reference to the accompanying drawings of the embodiments of this disclosure. The described embodiments are a part of the embodiments of this disclosure, rather than all of the embodiments. Other embodiments obtained by a person of ordinary skill in the art are within the scope of this disclosure.

Examples of terms involved in the embodiments of the disclosure are briefly introduced. The descriptions of the terms are provided as examples only and are not intended to limit the scope of the disclosure.

For a head display device in the field of extended reality, based on a data processing method provided in the embodiments of this disclosure, a movement trajectory of a camera on the head display device when the head display device moves may be determined, and then a pose estimation parameter of the head display device is adjusted based on the movement trajectory of the camera.

XR refers to combining reality with virtuality by using a computer to create a virtual environment of human-computer interaction, and is also a general term for a plurality of technologies such as virtual reality (VR), augmented reality (AR), and mixed reality (MR). XR may further combine visual interaction technologies of VR, AR, and MR, to bring "immersion" of seamless conversion between a virtual world and a real world to an experiencer.

The head display device is an abbreviation of a head-mounted display (HMD) device configured to perform scene interaction with the experience, and all head-mounted display devices may be referred to as head display devices. An optical signal may be transmitted to eyes by using various head-mounted display devices according to different methods, to achieve different technical effects such as virtual reality, augmented reality, and mixed reality.

In virtual reality, three-dimensional (3D) space that is stereoscopic and highly simulated is simulated by using a computer technology. When a user wears a VR head display device, an illusion that the user is in reality is generated. In this space, the user may use a controller or a keyboard to perform shuttling or interaction in a virtual environment.

In augmented reality, virtual information is applied to a real world by using a computer technology, and a real environment and a virtual object are superposed in a same picture or same space in real time and simultaneously exist.

In mixed reality, a real world and a virtual world are combined by using a computer technology, to create a new environment and a virtual image consistent with general visual cognition. In this case, an object in the real world and an object in the virtual world can jointly exist and interact in real time.

FIG. 1 is a schematic diagram of a scenario in which a head display device is used according to an embodiment of this disclosure. As shown in FIG. 1, a user may interact with a virtual scene after wearing a head display device 11.

At least one camera 12 is connected to the head display device 11, and is configured to shoot an environment around the user, to better use shot image information for display, interaction, and the like of the virtual scene.

For a data processing device 13, the data processing device 13 may determine a plurality of calibration target images shot by the camera 12 of the head display device 11, and then finally determine, based on each calibration target image shot by the camera 12, a movement trajectory of the camera 12 when the head display device 11 moves within any preset time period, to adjust a pose estimation parameter of the head display device 11 based on the determined movement trajectory.

The data processing device 13 may be a server or a terminal device having a data processing capability.

The server may be a vehicle-to-everything (V2X) server or another independent server, or may be a server cluster or distributed system including a plurality of physical servers, or may be a cloud server, such as a vehicle-to-everything edge cloud platform or a cloud computing platform, that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal device may be a smartphone, a tablet computer, a notebook computer, a desktop computer, a smart speech interaction device (such as a smart speaker), a wearable electronic device (such as a smart watch), a vehicle-mounted device, a smart appliance (such as a smart television), an AR/VR device, or the like, but is not limited thereto.

FIG. 2 is a schematic flowchart of a data processing method according to an embodiment of this disclosure. As shown in FIG. 2, the data processing method may specifically include the following operations.

Operation S21: Obtain at least one calibration target image determined by a head display device in a process in which the head display device moves in a motion capture area.

In some implementations, a plurality of calibration targets are disposed in the motion capture area. When the head display device moves in the motion capture area, a camera on the head display device may shoot with the movement of the head display device, to obtain a shot image, and further determine, as the calibration target image, the shot image including the calibration target.

The head display device includes a motion capture object, and the motion capture object is rigidly connected to the head display device. In the process in which the head display device moves in the motion capture area, a motion capture system may perform motion capture on the motion capture object moving in the motion capture area, to determine information, such as pose information and a movement trajectory, about the motion capture object during movement.

In the process in which the head display device moves in the motion capture area, each camera on the head display device may shoot the motion capture area during movement, to obtain a calibration target image including the calibration target. The head display device includes at least one camera.

In other words, each calibration target image obtained in this embodiment of this disclosure is shot by one camera on the head display device during movement of the head display device. All the calibration target images obtained in this embodiment of this disclosure may be one or more calibration target images shot by one camera, or may be a plurality of calibration target images shot by different cameras. This is not limited herein.

The calibration target is a flat board having a spaced pattern array, and same patterns in the calibration target may be referred to as a checkerboard. In applications such as machine vision, image measurement, photogrammetry, and three-dimensional reconstruction, the calibration target may be configured for correcting lens distortion, determining a conversion relationship between a physical size and a pixel, determining a three-dimensional geometrical location of a point on a surface of a space object, determining a relationship between the three-dimensional geometrical location and a corresponding point in the image, and the like.

FIG. 3a to FIG. 3d are schematic diagrams of a calibration target image according to an embodiment of this disclosure. As shown in FIG. 3a to FIG. 3d, during movement of a head display device, a camera on the head display device may shoot calibration targets in a motion capture area at different moments and different angles, to obtain a plurality of calibration target images.

In a process in which the calibration target images are determined, a disposing location, a posture, an angle, and the like of each calibration target in the motion capture area remains unchanged, that is, during movement of the head display device, all the calibration targets in the motion capture area remain in original forms.

Operation S22: Determine at least one corner point from the at least one calibration target image, and determine projection coordinates of first coordinates of each corner point in a calibration target coordinate system to an image coordinate system in which the corner point is located.

For each corner point, the projection coordinates of the first coordinates of the corner point in the calibration target coordinate system to the image coordinate system in which the corner point is located are essentially coordinates obtained by converting (or projecting) the first coordinates of the corner point in the calibration target coordinate system to the image coordinate system. In addition, the projection coordinates of the first coordinates of the corner point in the calibration target coordinate system to the image coordinate system in which the corner point is located are not necessarily the same as second coordinates of the corner point in the image coordinate system, and are specifically determined based on related parameters used for performing coordinate conversion on the first coordinates of the corner point.

In some implementations, after the at least one calibration target image is determined, the at least one corner point may be determined from the at least one calibration target image.

For example, after a calibration target image is obtained based on operation S21, at least one corner point may be determined from the calibration target image. After a plurality of calibration target images are obtained based on operation S21, one or more corner points may be determined from any one or more of the calibration target images.

For each calibration target image, if one or more corner points need to be determined from the calibration target image, at least one corner point in the calibration target image may be determined based on a checkerboard detection algorithm, an AprilTag detection algorithm, a two-dimensional barcode detection algorithm, another existing detection algorithm, a calibration tool, and the like.

Figure 4:
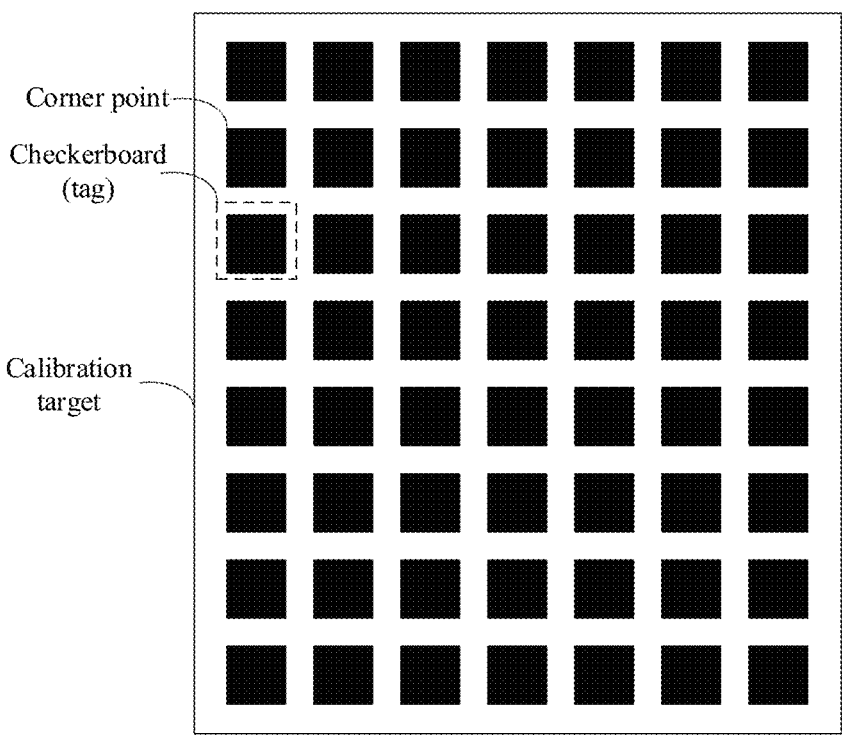
FIG. 4 is a schematic diagram of a calibration target according to an embodiment of this disclosure.

FIG. 4 is a schematic diagram of a calibration target according to an embodiment of this disclosure. As shown in FIG. 4, each black block in the calibration target may be referred to as a checkerboard, or may be referred to as a tag. In addition, each black block may include another information item configured for helping determine the black block, such as a special identifier, a pattern, or a two-dimensional barcode. This is not limited herein.

In addition, sizes and shapes of black blocks (tags) in any calibration target are completely the same, and four vertexes of each black block are corner points corresponding to the black block.

In an example, for each calibration target image, binarization processing may be performed on the calibration target image based on a local average adaptive thresholding method, to obtain a first image, and image dilation processing is performed on the first image to reduce a connection between black blocks (tags) and obtain a second image. Quadrilateral detection is performed on the second image. For each quadrangle, a vertex of the quadrangle is determined as a corner point.

In an example, for each calibration target image, each black block (tag) in the calibration target image is a two-dimensional barcode. At least one two-dimensional barcode in the calibration target image may be detected based on a two-dimensional barcode detection algorithm, and a vertex of each two-dimensional barcode is further determined as a corner point.

The foregoing manner of determining the corner point in the calibration target image is merely an example, and may be specifically determined based on a requirement of an actual application scenario. This is not limited herein.

In some implementations, for each corner point, when the first coordinates of the corner point in the calibration target coordinate system are determined, the calibration target coordinate system may be first determined.

Calibration target coordinate systems corresponding to calibration targets in each calibration target image are the same, and the calibration target coordinate system may be determined based on a right-hand coordinate system or in another manner. Specifically, the calibration target coordinate system may be determined based on a requirement of an actual application scenario. This is not limited herein.

Figure 5:
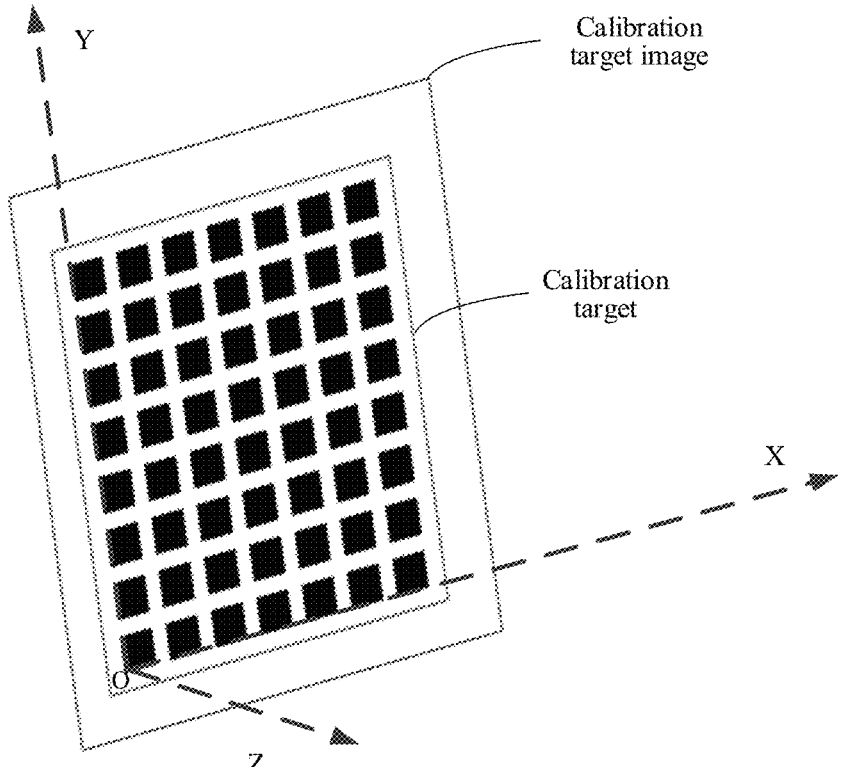
FIG. 5 is a schematic diagram of a scenario in which a calibration target coordinate system is determined according to an embodiment of this disclosure.

Using the right-hand coordinate system as an example, FIG. 5 is a schematic diagram of a scenario in which a calibration target coordinate system is determined according to an embodiment of this disclosure. As shown in FIG. 5, for a calibration target in each calibration target image, a lower left corner point of a black block at a lower left corner of the calibration target may be determined as an origin of a calibration target coordinate system, a straight line on which lower edges of a last row of black blocks in the calibration target are located is determined as an x-axis, a rightward direction of the origin is determined as a positive direction of the x-axis, a straight line on which left edges of a leftmost column of black blocks in the calibration target are located is determined as a y-axis, an upward direction of the origin is determined as a positive direction of the y-axis, a straight line passing through the origin and perpendicular to the calibration target is determined as a z-axis, and an outward direction perpendicular to the calibration target is a positive direction of the z-axis.

Based on this, the calibration target coordinate system corresponding to the calibration target in the calibration target image may be determined.

Further, for each corner point in any calibration target image, a location of the corner point in a corresponding calibration target may be first determined. The location of the corner point in the corresponding calibration target is configured for indicating a relative location (for example, an upper left corner, a lower left corner, an upper right corner, or a lower right corner) of the corner point in a black block (tag) in which the corner point is located, and configured for indicating positions of the black block (tag) in which the corner point is located in a direction x and a direction of a y-axis.

In addition, a side length of each checkerboard in the calibration target image in which the corner point is located and a gap between any two checkerboards may further be determined. Sizes of checkerboards in each calibration target image are the same, and the gap between any two checkerboards is the same.

Based on this, for each corner point, a linear distance from the corner point to an x-axis of the calibration target coordinate system and a linear distance from the corner point to a y-axis of the calibration target coordinate system may be determined based on the location of the corner point in the corresponding calibration target, the side length of each checkerboard (tag) in the calibration target image in which the corner point is located, and the gap between any two checkerboards (tags). Further, the first coordinates of the corner point in the calibration target coordinate system are determined based on the linear distance from the corner point to the x-axis of the calibration target coordinate system and the linear distance from the corner point to the y-axis of the calibration target coordinate system.

In an example, for each corner point, if a tag of a calibration target in which the corner point is located is a $b^{th}$ tag in the direction x and an $a^{th}$ tag in the direction of the y-axis, in a case that a side length of each tag is s, and a gap between any two tag is g, refer to the following descriptions:

When the corner point is located at a lower left corner of the tag in which the corner point is located, coordinates of the corner point in the calibration target coordinate system are:

$$p = \begin{bmatrix} b(s+g) \\ a(s+g) \\ 0 \end{bmatrix}$$

When the corner point is located at an upper left corner of the tag in which the corner point is located, coordinates of the corner point in the calibration target coordinate system are:

$$p = \begin{bmatrix} b(s+g) \\ a(s+g)+s \\ 0 \end{bmatrix}$$

When the corner point is located at an upper right corner of the tag in which the corner point is located, coordinates of the corner point in the calibration target coordinate system are:

$$p = \begin{bmatrix} b(s+g)+s \\ a(s+g)+s \\ 0 \end{bmatrix}$$

When the corner point is located at a lower right corner of the tag in which the corner point is located, coordinates of the corner point in the calibration target coordinate system are:

$$p = \begin{bmatrix} b(s+g)+s \\ a(s+g) \\ 0 \end{bmatrix}$$

Because the side lengths of the checkerboards and the gap between the checkerboards are fixed, in the first coordinates that are determined based on the foregoing implementation and that are of the corner point in the calibration target coordinate system, a positioning deviation caused by inaccurate image positioning can be effectively eliminated in comparison with a conventional image positioning algorithm, so that a result of calculating the first coordinates of each corner point in the calibration target coordinate system is more accurate.

In some implementations, for each corner point, when the projection coordinates of the first coordinates of the corner point in the calibration target coordinate system to the image coordinate system in which the corner point is located are determined, third coordinates of the corner point in a camera coordinate system corresponding to a camera that shoots the corner point may be determined based on the first coordinates of the corner point in the calibration target coordinate system, that is, the first coordinates of the corner point in the calibration target coordinate system are first converted into the third coordinates in the camera coordinate system corresponding to the camera that shoots the corner point.

For any camera, a camera coordinate system corresponding to the camera is a three-dimensional rectangular coordinate system established by using a focusing center of the camera as an origin and using an optical axis as a Z-axis.

For each corner point, the first coordinates of the corner point in the calibration target coordinate system may be converted into three-dimensional homogeneous coordinates, and the three-dimensional homogeneous coordinates are further converted into the third coordinates of the corner point in the camera coordinate system corresponding to the camera that shoots the corner point.

Figure 6:
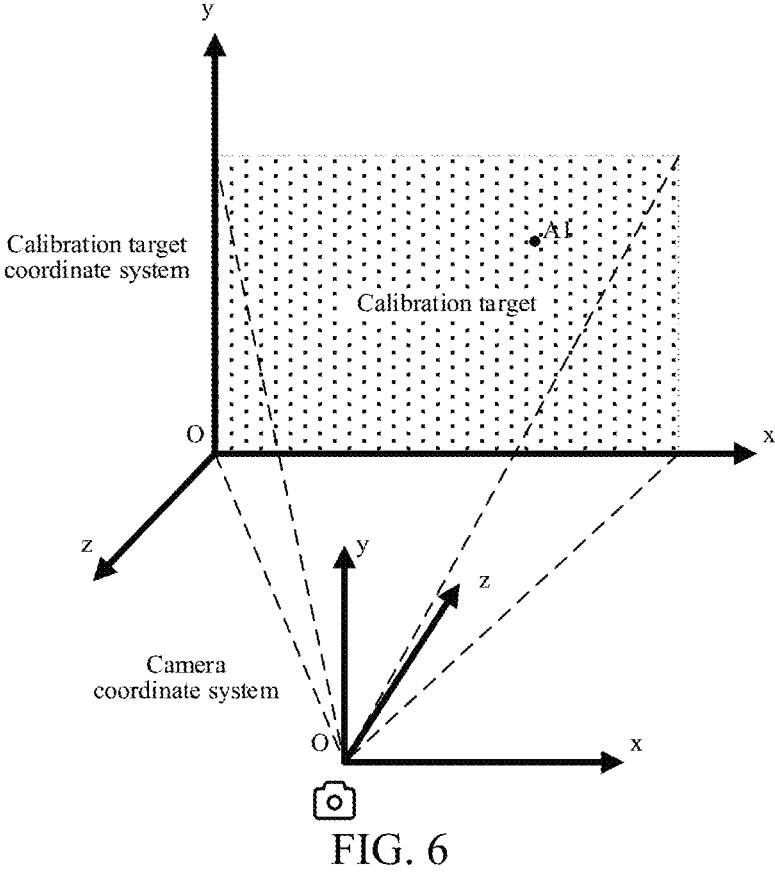
FIG. 6 is a schematic diagram 1 of a correspondence in a coordinate system according to an embodiment of this disclosure.

FIG. 6 is a schematic diagram 1 of a correspondence in a coordinate system according to an embodiment of this disclosure. FIG. 6 shows a correspondence between a camera coordinate system corresponding to a camera and a calibration target coordinate system corresponding to a calibration target image. For a corner point A1 in a calibration target, after first coordinates of the corner point A1 in the calibration target coordinate system are determined, third coordinates of the corner point A1 in the camera coordinate system may be determined based on the first coordinates of the corner point A1 in the calibration target coordinate system, that is, a spatial location of the corner point A1 in the camera coordinate system is determined.

The camera coordinate system in FIG. 6 is a camera coordinate system corresponding to a camera that shoots the corner point A1, and the calibration target coordinate system in FIG. 6 is a calibration target coordinate system corresponding to the calibration target in which the corner point A1 is located.

Further, projection coordinates of the first coordinates of the corner point to an image coordinate system in which the corner point is located may be determined based on an internal parameter of the camera and the third coordinates of the corner point in the camera coordinate system corresponding to the camera that shoots the corner point.

To be specific, the third coordinates of the corner point in the camera coordinate system corresponding to the camera that shoots the corner point are converted into coordinates in the image coordinate system based on the internal parameter corresponding to the camera that shoots the corner point, and the converted coordinates in the image coordinate system are determined as the projection coordinates of the first coordinates of the corner point to the image coordinate system in which the corner point is located.

In an example, if first coordinates that are of a $j^{th}$ corner point in a calibration target in a calibration target image i and that are in a calibration target coordinate system are $P_{ij}$, after the first coordinates are converted into three-dimensional homogeneous coordinates $\overline{P}_{ij}$, third coordinates of the corner point in a camera coordinate system corresponding to a camera that shoots the corner point are $\hat{P}_{ij}$. In this case, projection coordinates of the first coordinates of the corner point to an image coordinate system are determined as $\hat{P}_{ij}=\pi(\hat{P}_{ij})$.

$$\pi(\hat{P}) = \pi\left(\begin{bmatrix} \hat{x} \\ \hat{y} \\ \hat{z} \\ 1 \end{bmatrix}\right) = \begin{bmatrix} \dfrac{x}{z} & f_x + c_x \\ \dfrac{y}{z} & f_y + c_y \end{bmatrix}.$$

$f_x$, $f_y$, $c_x$, and $c_y$ are internal parameters of the camera. $f_x$ and $f_y$ respectively represent focal lengths of the camera in a direction x and a direction y, and $c_x$ and $c_y$ respectively represent optical centers of the camera in the direction x and the direction y.

Image coordinate systems corresponding to calibration target images are the same. In addition, when the image coordinate system is determined, the image coordinate system may be constructed by using an upper left corner, an upper right corner, a lower left corner, a lower right corner, or an image center of the calibration target image as an origin. Specifically, the image coordinate system may be determined based on a requirement of an actual application scenario. This is not limited herein.

Figure 7:
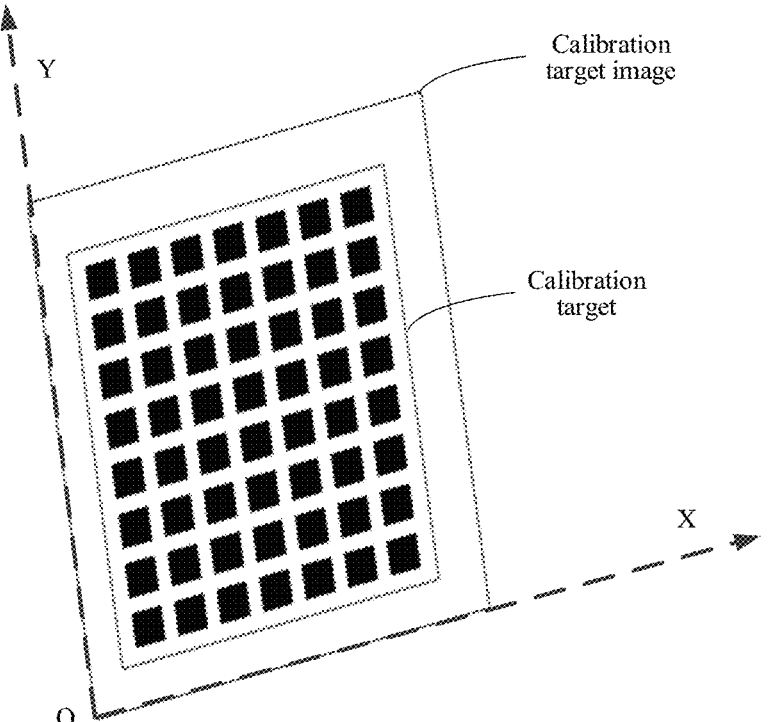
FIG. 7 is a schematic diagram of a scenario in which an image coordinate system is determined according to an embodiment of this disclosure.

In an example, FIG. 7 is a schematic diagram of a scenario in which an image coordinate system is determined according to an embodiment of this disclosure. As shown in FIG. 7, for each calibration target image, a lower left corner of the calibration target image may be determined as an origin of an image coordinate system, a straight line on which a lowest edge of the calibration target image is located is determined as an x-axis, a rightward direction of the origin is determined as a positive direction of the x-axis, a straight line on which a leftmost edge of the calibration target image is located is determined as a y-axis, and an upward direction of the origin is determined as a positive direction of the y-axis.

Based on this, the calibration target coordinate system corresponding to the calibration target image may be determined.

Further, for each corner point in any calibration target image, when the third coordinates of the corner point in the camera coordinate system corresponding to the camera that shoots the corner point are determined based on the first coordinates of the corner point in the calibration target coordinate system, a second transformation matrix from a world coordinate system corresponding to the motion capture system to an object coordinate system in which the motion capture object is located when the calibration target image in which the corner point is located is shot may be first determined based on the motion capture system.

The motion capture system may perform motion capture on the motion capture object on the head display device moving in the motion capture area. Therefore, any base coordinate system (BCS) may be selected from an environment to describe locations of objects in the motion capture area, and the base coordinate system may be referred to as a world coordinate system.

The head display device includes at least one motion capture object, and an object coordinate system configured for representing a relative location of each motion capture object may be constructed based on each motion capture object. In addition, each motion capture object is rigidly connected to the head display device, to be specific, a relative location between each motion capture object and the head display device remains unchanged during movement of the head display device.

The motion capture object may be a fluorescent object of any material, such as a fluorescent sphere, or may be an object having a reflective effect. This is not limited herein.

When the object coordinate system is determined, a three-dimensional space coordinate system may be constructed by using any location in space in which each motion capture object is located as an origin, and the three-dimensional space coordinate system is used as the object coordinate system in which each motion capture object is located.

Figure 8:
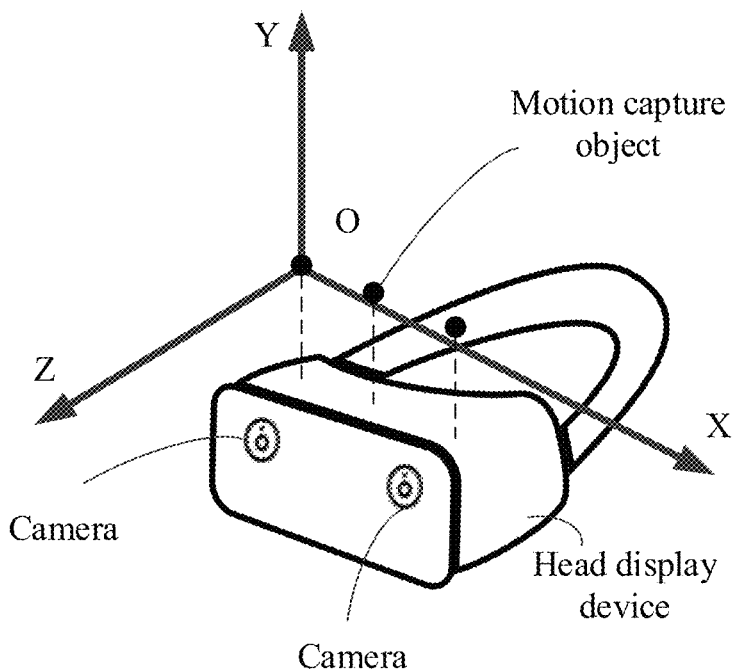
FIG. 8 is a schematic diagram of a scenario in which an object coordinate system is determined according to an embodiment of this disclosure.

For example, FIG. 8 is a schematic diagram of a scenario in which an object coordinate system is determined according to an embodiment of this disclosure. In a case that the head display device includes a plurality of motion capture objects (fluorescent spheres), a three-dimensional space coordinate system may be constructed by using a location of any fluorescent sphere as an origin, to obtain a final object coordinate system.

For each calibration target image, the second transformation matrix from the world coordinate system corresponding to the motion capture system to the object coordinate system in which the motion capture object is located when the calibration target image is shot is configured for representing a manner of converting coordinates of each motion capture object in the world coordinate system into coordinates in the object coordinate system in which the motion capture object is located when the calibration target image is shot.

For each calibration target image, when the second transformation matrix from the world coordinate system corresponding to the motion capture system to the object coordinate system in which the motion capture object is located is determined, the pose information of the motion capture object when the calibration target image is shot may be determined based on the motion capture system. The pose information may be configured for reflecting a manner of transforming coordinates of each motion capture object in the object coordinate system into coordinates in the world coordinate system. Therefore, the pose information of the motion capture object when the calibration target image is shot is determined based on the motion capture system, and the second transformation matrix from the world coordinate system corresponding to the motion capture system to the object coordinate system in which the motion capture object is located when the calibration target image is shot is determined.

The motion capture system may capture a movement picture of the motion capture object in the motion capture area, and further perform analysis based on the movement picture of the motion capture object, to obtain the pose information of the motion capture object when each calibration target image is shot.

In an example, for a calibration target image i, pose information of a motion capture object when the calibration target image is shot may be represented as $$\begin{smallmatrix} \text{base} \\ \text{marker} \end{smallmatrix} T_i,$$

where base represents a world coordinate system, and marker represents an object coordinate system. In this case, a second transformation matrix from the world coordinate system corresponding to a motion capture system to the object coordinate system in which the motion capture object is located when the calibration target image is shot may be represented as $$\begin{smallmatrix} \text{marker} \\ \text{base} \end{smallmatrix} T_i.$$

Figure 9:
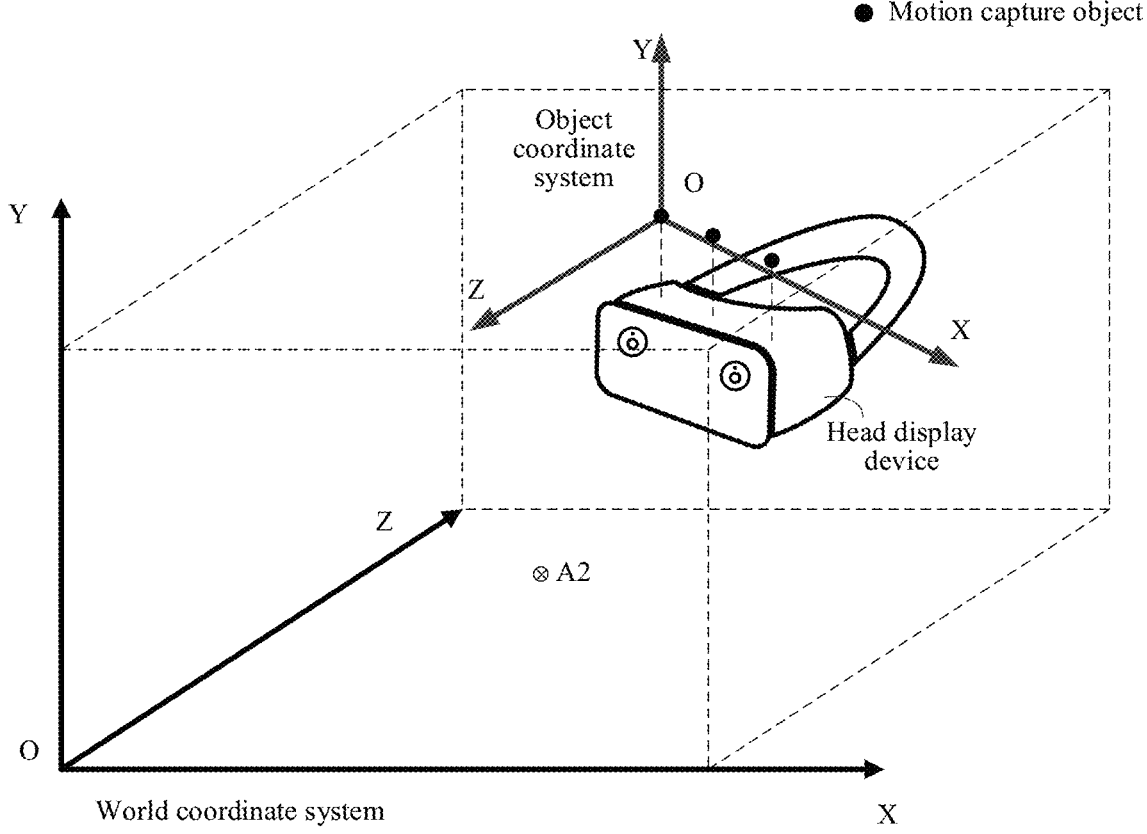
FIG. 9 is a schematic diagram 2 of a correspondence in a coordinate system according to an embodiment of this disclosure.

FIG. 9 is a schematic diagram 2 of a correspondence in a coordinate system according to an embodiment of this disclosure. FIG. 9 shows a correspondence between the world coordinate system corresponding to the motion capture system and the object coordinate system corresponding to the motion capture object. After the object coordinate system is constructed based on the motion capture object on the head display device, the world coordinate system corresponding to the motion capture system may be constructed in space in which the head display device is located.

A manner of transformation between coordinates that are of any location in the space in which the head display device is located and that are in the world coordinate system and coordinates in the object coordinate system may be implemented based on the second transformation matrix from the world coordinate system corresponding to the motion capture system to the object coordinate system in which the motion capture object is located.

For example, for a location A2 in the space, after coordinates of A2 in the world coordinate system are determined, the coordinates of A2 in the world coordinate system may be converted into coordinates of A2 in the object coordinate system based on the second transformation matrix. After the coordinates of A2 in the object coordinate system are determined, the coordinates of A2 in the object coordinate system may also be converted into the coordinates of A2 in the world coordinate system based on the second transformation matrix.

Further, for each corner point, after the second transformation matrix from the world coordinate system corresponding to the motion capture system to the object coordinate system in which the motion capture object is located is determined, a third transformation matrix from the object coordinate system in which the motion capture object is located to the camera coordinate system corresponding to the camera that shoots the corner point may be determined.

For each corner point, the third transformation matrix from the object coordinate system in which the motion capture object is located to the camera coordinate system corresponding to the camera that shoots the corner point may be configured for representing a manner of transforming coordinates of the motion capture object in the object coordinate system into coordinates in the camera coordinate system corresponding to the camera that shoots the corner point.

Figures 10, 11:
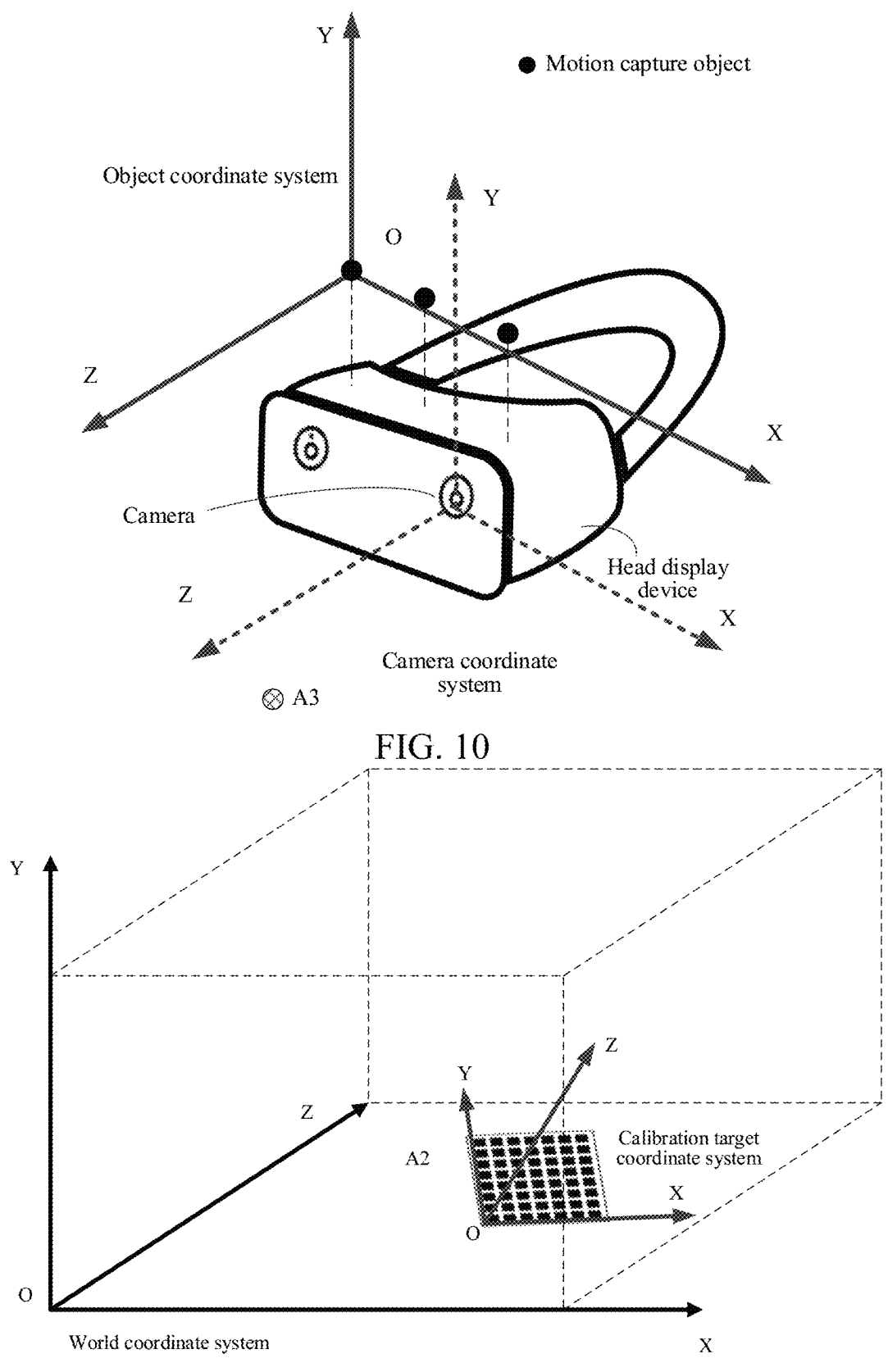
FIG. 10 is a schematic diagram 3 of a correspondence in a coordinate system according to an embodiment of this disclosure.
FIG. 11 is a schematic diagram 4 of a correspondence in a coordinate system according to an embodiment of this disclosure.

FIG. 10 is a schematic diagram 3 of a correspondence in a coordinate system according to an embodiment of this disclosure. FIG. 10 shows a correspondence between an object coordinate system corresponding to a motion capture object and a camera coordinate system corresponding to a camera.

The camera and a marked object are located in same space. A manner of transformation between coordinates that are of any location in the space in which the camera and the marked object are located and that are in the object coordinate system and coordinates in the camera coordinate system may be determined based on a third transformation matrix from the object coordinate system in which the motion capture object is located to the camera coordinate system corresponding to the camera.

For example, for a location A3 in the space, after coordinates of A3 in the camera coordinate system are determined, the coordinates of A3 in the camera coordinate system may be converted into coordinates of A3 in the object coordinate system based on the third transformation matrix. After the coordinates of A3 in the object coordinate system are determined, the coordinates of A2 in the object coordinate system may also be converted into the coordinates of A2 in the camera coordinate system based on the third transformation matrix.

In an example, for each corner point, the third transformation matrix from the object coordinate system in which the motion capture object is located to a camera coordinate system corresponding to a camera k that shoots the calibration target image i in which the corner point is located may be represented as $$\substack{cam_k \\ marker}T.$$

The third transformation matrix is an unknown quantity.

Further, when the third transformation matrix is determined, a fourth transformation matrix from the calibration target coordinate system to the world coordinate system also needs to be determined. The fourth transformation matrix may be configured for representing a manner of transformation between coordinates in the calibration target coordinate system to coordinates in the world coordinate system.

FIG. 11 is a schematic diagram 4 of a correspondence in a coordinate system according to an embodiment of this disclosure. FIG. 11 shows a correspondence between the calibration target coordinate system and the world coordinate system.

For any calibration target image, a three-dimensional space coordinate system may be constructed, as a world coordinate system, in space in which the calibration target image is located. After a calibration target coordinate system corresponding to the calibration target image is determined, for any corner point in the calibration target image, based on a fourth transformation matrix from the calibration target coordinate system to the world coordinate system, coordinates of the corner point in the calibration target coordinate system may be converted into coordinates of the corner point in the world coordinate system, or coordinates of the corner point in the world coordinate system may be converted into coordinates of the corner point in the calibration target coordinate system.

In an example, the fourth transformation matrix from the calibration target coordinate system to the world coordinate system may be represented as $$\substack{base \\ target}T.$$

The fourth transformation matrix is an unknown quantity.

For each corner point, the third coordinates of the corner point in the camera coordinate system corresponding to the camera that shoots the corner point may be determined based on the second transformation matrix from the world coordinate system to the object coordinate system in which the motion capture object is located when the calibration target image in which the corner point is located is shot, the third transformation matrix from the object coordinate system to the camera coordinate system corresponding to the camera that shoots the corner point, and the fourth transformation matrix from the calibration target coordinate system to the world coordinate system.

In an example, for the $j^{th}$ corner point in the calibration target in the calibration target image i, the third coordinates $\hat{P}_{ij}$ of the corner point in the camera coordinate system corresponding to the camera that shoots the corner point may be determined in the following manner:

$$\hat{P}_{ij} = \substack{cam_k \\ marker}T \cdot \substack{marker \\ base}T_i \cdot \substack{base \\ target}T \cdot \overline{P}_{ij}$$

$\overline{P}_{ij}$ is the three-dimensional homogeneous coordinates corresponding to the first coordinates of the corner point in the calibration target coordinate system.

Because the second transformation matrix and the third transformation matrix are unknown quantities, in this case, the third coordinates of the corner point in the camera coordinate system corresponding to the camera that shoots the corner point are also unknown quantities.

$$\substack{B \\ A}T = \begin{bmatrix} r_1 & r_2 & r_3 & t_x \\ r_4 & r_5 & r_6 & t_y \\ r_7 & r_8 & r_9 & t_z \\ 0 & 0 & 0 & 1 \end{bmatrix}$$

represents a transformation matrix from a coordinate system A to a coordinate system B, $$\begin{bmatrix} r_1 & r_2 & r_3 \\ r_4 & r_5 & r_6 \\ r_7 & r_8 & r_9 \end{bmatrix}$$

represents a rotation matrix from the coordinate system A to the coordinate system B, and $$\begin{bmatrix} t_x \\ t_y \\ t_z \end{bmatrix}$$

represents a translation vector from the coordinate system A to the coordinate system B. The coordinate system A or the coordinate system B is any one of the world coordinate system, the object coordinate system, the camera coordinate system, and the calibration target coordinate system, and the coordinate system A and the coordinate system B are different.

Based on the foregoing implementation, for each corner point, in a case that the first coordinates of the corner point in the calibration target coordinate system are known, the first coordinates of the corner point may be converted into the coordinates of the corner point in the image coordinate system by constructing a plurality of unknown quantities (the second transformation matrix from the object coordinate system to the camera coordinate system corresponding to the camera that shoots the corner point and the third transformation matrix from the calibration target coordinate system to the world coordinate system) and based on a determined known quantity (a first transformation matrix from the world coordinate system to the object coordinate system), to obtain the projection coordinates in the image coordinate system that are represented based on the unknown quantities. Data basis is provided for subsequent adjustment of a pose estimation parameter of the head display device on the premise that the projection coordinates of the first coordinates of each corner point to the image coordinate system are unknown quantities.

Operation S23: Determine second coordinates of each corner point in the image coordinate system and an offset distance between the projection coordinates and the second coordinates of each corner point, and determine, based on the offset distance corresponding to each corner point, the first transformation matrix from the object coordinate system in which the motion capture object is located to a camera coordinate system corresponding to a first camera.

In some implementations, the first camera is any camera on the head display device. Specifically, the first camera may be determined based on a requirement of an actual application scenario. This is not limited herein.

The first transformation matrix from the object coordinate system in which the motion capture object is located to the camera coordinate system corresponding to the first camera may be configured for representing a manner of transforming coordinates in the object coordinate system into coordinates in the camera coordinate system corresponding to the first camera.

In some implementations, for each corner point, after the projection coordinates of the first coordinates of the corner point in the calibration target coordinate system to the image coordinate system in which the corner point is located are determined, a distance between the projection coordinates and the second coordinates of the corner point in the image coordinate system may be determined as the offset distance between the projection coordinates and the second coordinates of the corner point in the image coordinate system.

For each calibration target image, a lower left corner of the calibration target image may be determined as a coordinate origin of the image coordinate system, a rightward direction of the origin is determined as an x-axis, and an upward direction of the origin is determined as a y-axis, to further determine the image coordinate system, and further determine the second coordinates of the corner point in the image coordinate system.

For each corner point, it can be learned in operation S22 that the projection coordinates of the first coordinates of the corner point in the calibration target coordinate system to the image coordinate system in which the corner point is located need to be determined based on the third transformation matrix from the object coordinate system to the camera coordinate system corresponding to the camera that shoots the corner point and the fourth transformation matrix from the calibration target coordinate system to the world coordinate system. Therefore, when the third transformation matrix and the fourth transformation matrix are unknown quantities, the projection coordinates of the first coordinates of the corner point in the calibration target coordinate system to the image coordinate system in which the corner point is located are also unknown quantities, and the offset distance between the projection coordinates and the second coordinates of the corner point in the image coordinate system is also an unknown quantity.

Based on this, when the first transformation matrix from the object coordinate system in which the motion capture object is located to the camera coordinate system corresponding to the first camera is determined, a projection optimization function may be determined based on the offset distance corresponding to each corner point. The projection optimization function is configured for representing a sum of squares of the offset distance between the projection coordinates and the second coordinates of each corner point in the image coordinate system.

Similarly, when the offset distance between the projection coordinates and the second coordinates of each corner point in the image coordinate system is also an unknown quantity, the projection optimization function is also an unknown quantity.

In an example, a projection optimization function E determined based on the offset distance corresponding to each corner point may be represented as:

$$E = \sum_{k=1}^{K} \sum_{i=1}^{M} \sum_{j=1}^{N_i} \left\| \pi \left( {}_{\text{marker}}^{\text{cam}_k} T \cdot {}_{\text{base}}^{\text{marker}} T_i \cdot {}_{\text{target}}^{\text{base}} T \cdot \mathcal{P}_{ij} \right) - u_{ij} \right\|^2$$

K represents a quantity of cameras, k is an index of a camera that shoots each calibration target image, M is a quantity of calibration target images, i is an index of the calibration target image, $N_i$ is a quantity of corner points in an $i^{th}$ calibration target image, and j is an index of a corner point in each calibration target image.

$${}_{\text{base}}^{\text{marker}} T_i$$

represents the second transformation matrix from the world coordinate system corresponding to the motion capture system to the object coordinate system in which the motion capture object is located when the calibration target image i is shot.

$${}_{\text{marker}}^{\text{cam}_k} T = G_{k,k=1,2,\dots,K}$$

represents the third transformation matrix from the object coordinate system in which the motion capture object is located to the camera coordinate system corresponding to the camera k. G represents the third transformation matrix, and is an unknown quantity in the foregoing formula.

$${}_{\text{target}}^{\text{base}} T$$

represents the fourth transformation matrix from the calibration target coordinate system to the world coordinate system, and is an unknown quantity in the foregoing formula.

$u_{ij}$ represents the second coordinates that are of the corner point j in the calibration target image i and that are in the image coordinate system.

$\overline{P}_{ij}$ represents the three-dimensional homogeneous coordinates corresponding to the first coordinates $P_{ij}$ that are of the corner point j in the calibration target image i and that are in the calibration target coordinate system.

$\| \ \|$ represents the offset distance between the projection coordinates and the second coordinates of each corner point in the image coordinate system.

For the projection optimization function E, the projection optimization function may be solved by using a non-linear least squares optimization algorithm, to obtain a third transformation matrix $$\underset{\text{marker}}{\overset{\text{cam}_k}{}} T = G_{k,k=1,2,\dots,K}$$

from the object coordinate system in which the motion capture object is located to a camera coordinate system corresponding to each camera when a function value of the projection optimization function E is minimum.

In this case, the third transformation matrix from the object coordinate system to the camera coordinate system corresponding to the first camera when the function value of the projection optimization function is minimum may be determined as the first transformation matrix from the object coordinate system to the camera coordinate system corresponding to the first camera.

For example, if a camera d is the first camera, a first transformation matrix from the object coordinate system to a camera coordinate system corresponding to the first camera d is $$G_d = \underset{\text{marker}}{\overset{\text{cam}_d}{}} T,$$

where d is greater than or equal to 1 and less than or equal to K.

The projection optimization function determined based on the offset distance corresponding to each corner point may include only a few unknown quantities including the third transformation matrix from the object coordinate system to the camera coordinate system corresponding to each camera and the fourth transformation matrix from the calibration target coordinate system to the world coordinate system, to effectively reduce complexity of the projection optimization function. In addition, when there are a few unknown quantities, a calculation amount for solving of a least squares method can be effectively reduced, to help improve solving precision and accuracy of the least squares method, so that the first transformation matrix from the object coordinate system to the camera coordinate system corresponding to the first camera better conforms to an actual manner of transformation between the object coordinate system and the camera coordinate system, and more accurate data support is further provided for subsequent related data processing and analysis performed based on the first transformation matrix.

In some implementations, when the third transformation matrix from the object coordinate system to the camera coordinate system corresponding to the camera that shoots the corner point is determined, whether the camera that shoots the corner point is the first camera may be determined.

If the camera that shoots the corner point is the first camera, a preset transformation matrix is determined as the third transformation matrix from the object coordinate system to the camera coordinate system corresponding to the camera that shoots the corner point.

The preset transformation matrix is an unknown quantity. To be specific, the preset transformation matrix is configured for representing the third transformation matrix from the object coordinate system to the camera coordinate system of the first camera.

If the camera that shoots the corner point is not the first camera, a fifth transformation matrix from the camera coordinate system corresponding to the first camera to the camera coordinate system corresponding to the camera that shoots the corner point may be determined, to determine, based on the fifth transformation matrix from the camera coordinate system corresponding to the first camera to the camera coordinate system corresponding to the camera that shoots the corner point and a preset matrix, the third transformation matrix from the object coordinate system to the camera coordinate system corresponding to the camera that shoots the corner point.

For each corner point, the fifth transformation matrix from the camera coordinate system corresponding to the first camera to the camera coordinate system corresponding to the camera that shoots the corner point is configured for representing a manner of transforming coordinates in the camera coordinate system corresponding to the first camera into coordinates in the camera coordinate system corresponding to the camera that shoots the corner point.

Figure 12:
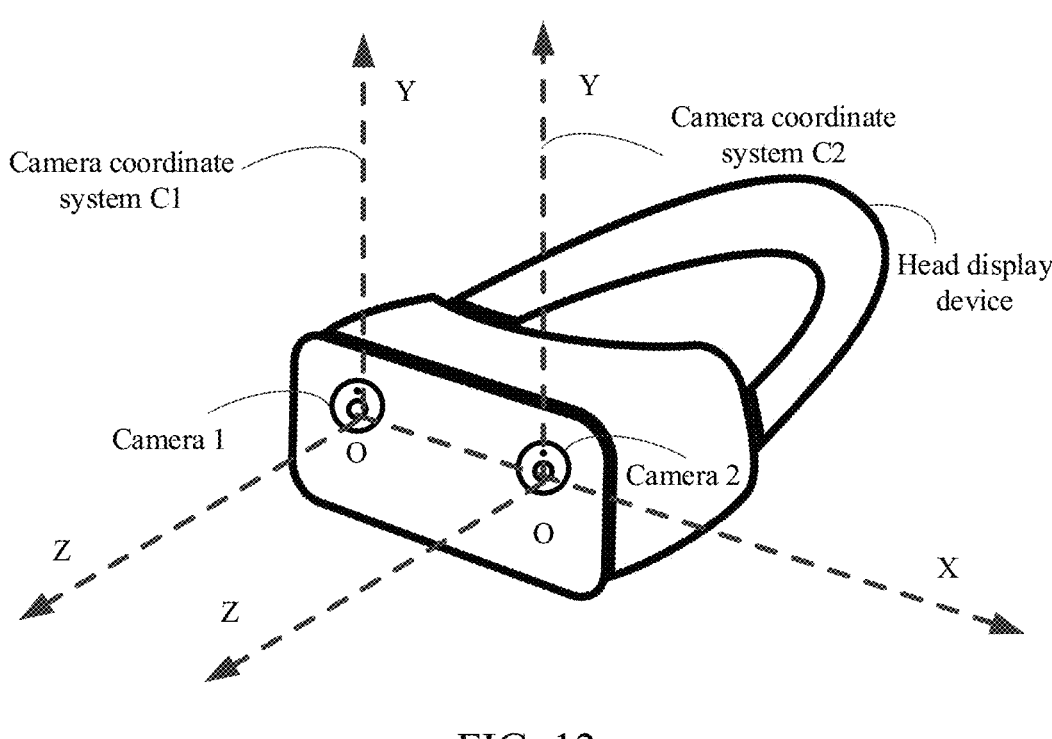
FIG. 12 is a schematic diagram 5 of a correspondence in a coordinate system according to an embodiment of this disclosure.

FIG. 12 is a schematic diagram 5 of a correspondence in a coordinate system according to an embodiment of this disclosure. FIG. 12 shows a correspondence between different camera coordinate systems.

Each camera on a head display device corresponds to an independent camera coordinate system. For any two cameras, for example, a camera 1 and a camera 2 in FIG. 12, a camera coordinate system C1 may be constructed based on the camera 1, and a camera coordinate system C2 may be constructed based on the camera 2. A manner of conversion between coordinates that are of any location in space in which the camera 1 and the camera 2 are located and that are in the camera coordinate system C1 and coordinates of the location in the camera coordinate system C2 may be determined based on a fifth transformation matrix from the camera coordinate system C1 to the camera coordinate system C2.

For example, for any location, after coordinates of the location in the camera coordinate system C1 are determined, the coordinates of the location in the camera coordinate system C1 may be converted into coordinates in the camera coordinate system C2 based on the fifth transformation matrix. After the coordinates of the location in the camera coordinate system C2 are determined, the coordinates of the location in the camera coordinate system C2 may also be converted into the coordinates in the camera coordinate system C1 based on the fifth transformation matrix.

In an example, for each corner point, if the third transformation matrix (namely, the preset transformation matrix) from the object coordinate system to the camera coordinate system corresponding to the first camera w is $$\underset{\text{marker}}{\overset{\text{cam}_w}{}} T,$$

and the fifth transformation matrix from the camera coordinate system corresponding to the first camera w to the camera coordinate system corresponding to the camera k that shoots the corner point is $$\genfrac{}{}{0pt}{}{cam_k}{cam_w}T,$$

the third transformation matrix from the object coordinate system to the camera coordinate system corresponding to the camera k that shoots the corner point satisfies $$\genfrac{}{}{0pt}{}{cam_k}{marker}T = \genfrac{}{}{0pt}{}{cam_k}{cam_w}T \cdot \genfrac{}{}{0pt}{}{cam_w}{marker}T.$$

w is less than or equal to K and greater than or equal to 1, where k is a quantity of marker cameras, and k is not equal to w.

Based on this, in a case that a fifth transformation matrix from the camera coordinate system corresponding to the first camera to the camera coordinate system corresponding to each of other cameras is known, the projection optimization function may be deformed into:

$$E = \sum_{k=1}^{K}\sum_{i=1}^{M}\sum_{j=1}^{N_i}\left\| \pi\left( \genfrac{}{}{0pt}{}{cam_k}{cam_w}T \cdot \genfrac{}{}{0pt}{}{cam_w}{marker}T \cdot \genfrac{}{}{0pt}{}{marker}{base}T_i \cdot \genfrac{}{}{0pt}{}{base}{target}T \cdot \overline{P}_{ij} \right) - u_{ij} \right\|^2$$

In this case, unknown quantities in the projection optimization function include only $$\genfrac{}{}{0pt}{}{cam_w}{marker}T \text{ and } \genfrac{}{}{0pt}{}{base}{target}T.$$

For the projection optimization function E, the projection optimization function may be solved by using the non-linear least squares optimization algorithm, to obtain the third transformation matrix $$\genfrac{}{}{0pt}{}{cam_w}{marker}T$$

from the object coordinate system in which the motion capture object is located to the camera coordinate system corresponding to the first camera when the function value of the projection optimization function E is minimum.

In the case that the fifth transformation matrix from a first coordinate system corresponding to the first camera to the camera coordinate system corresponding to each of other cameras is known, the projection optimization function may be deformed based on each fifth transformation matrix, to further reduce an unknown quantity in the projection optimization function. Therefore, difficulty in solving the projection optimization function is further reduced, and accuracy of solving the projection optimization function is improved.

Operation S24: Determine, based on the first transformation matrix and a first movement trajectory of the motion capture object in the world coordinate system when the head display device moves within a preset time period, a second movement trajectory of the first camera in the world coordinate system within the preset time period, and adjust the pose estimation parameter of the head display device based on the second movement trajectory.

In some implementations, after the first transformation matrix from the object coordinate system in which the motion capture object is located to the camera coordinate system corresponding to the first camera is determined, the head display device may be enabled to move in the motion capture area within the preset time period, and the first movement trajectory of the motion capture object on the head display device in the world coordinate system is determined based on the motion capture system.

The first movement trajectory of the motion capture object on the head display device in the world coordinate system may be directly determined based on related data captured by the motion capture system. This is not described herein.

When the head display device moves within the preset time period, the camera does not need to shoot the calibration target.

Because the first transformation matrix from the object coordinate system in which the motion capture object is located to the camera coordinate system corresponding to the target object is determined, the first movement trajectory of the motion capture object in the world coordinate system when the head display device moves within the preset time period may be converted, based on the first transformation matrix, into the second movement trajectory of the camera in the world coordinate system within the preset time period.

In some implementations, the pose estimation parameter of the head display device is configured for determining pose information, location information, and the like of each camera, to determine an offset distance, a rotation manner, and the like of each camera at each moment relative to those at a previous moment. Therefore, a motion state of each camera may be determined. The head display device may provide, to an experiencer based on the motion state of each camera and by using a display apparatus of the head display device, a picture matching the motion state of the camera, to further implement human-computer interaction.

Based on this, after the second movement trajectory of the first camera in the world coordinate system is determined, if the head display device moves according to a preset trajectory within the preset time period, the second movement trajectory of the first camera in the world coordinate system may be compared with the preset trajectory of the first camera in the world coordinate system, to determine a first trajectory error between the second movement trajectory of the first camera within the preset time period and the preset trajectory in the world coordinate system.

Further, the pose estimation parameter of the head display device may be adjusted based on the first trajectory error, so that a movement trajectory that is of the first camera and that is estimated by the head display device is closer to the preset trajectory of the first camera, to improve a display effect of the head display device.

In some embodiments, in a process in which the head display device moves within the preset time period, the head display device determines, based on the pose estimation parameter, pose information, location information, and the like of the first camera at each moment within the preset time period, to further determine, based on the pose information, the location information, and the like of the first camera at each moment within the preset time period, a third movement trajectory of the first camera within the preset time period, that is, a trajectory of six degrees of freedom of the first camera within the preset time period.

The third movement trajectory that is determined by the head display device and that is of the first camera within the preset time period is a movement trajectory that is estimated based on a sensor, a related algorithm, and the like and that is of the first camera in the world coordinate system.

Based on this, the second movement trajectory of the first camera in the world coordinate system within the preset time period may be considered as an actual movement trajectory of the first camera. Therefore, the second movement trajectory may be compared with the third movement trajectory that is of the first camera and that is determined by the head display device, to determine a trajectory error between the second movement trajectory and the third movement trajectory.

Further, the pose estimation parameter of the head display device may be adjusted based on the trajectory error between the second movement trajectory and the third movement trajectory, so that a movement trajectory that is of the first camera and that is estimated by the head display device is closer to the actual movement trajectory of the first camera, to improve a display effect of the head display device.

In this embodiment of this disclosure, after the projection coordinates of the coordinates of each corner point in the calibration target image in the calibration target coordinate system to the image coordinate system are determined, the first transformation matrix from the object coordinate system to the camera coordinate system corresponding to the first camera on the head display device may be determined based on the offset distance between the projection coordinates of each corner point and the coordinates of the corner point in the image coordinate system. Based on this, not only an impact of an error caused by a restored movement trajectory of the first camera when the first transformation matrix is determined based on the restored movement trajectory can be avoided, but also efficiency of determining the first transformation matrix can be effectively improved.

Further, the movement trajectory of the motion capture object on the head display device within the preset time period may be converted into an actual movement trajectory of the first camera within the preset time period by using the first transformation matrix, so that the pose estimation parameter of the head display device can be accurately adjusted based on the actual movement trajectory of the first camera, to help improve accuracy of predicting six degrees of freedom of the first camera by the head display device, and improve a display effect of the head display device.

The plurality of transformation matrices, coordinates, and movement trajectories determined in the embodiments of this disclosure may be stored in specified storage space. The specified storage space may be a database, cloud storage, or a blockchain, and may be specifically determined based on a requirement of an actual application scenario. This is not limited herein.

The database may be briefly considered as an electronic file cabinet, that is, a place for storing an electronic file, and may be a relational database (RD) (structured query language (SQL) database) or a non-relational database (NoSQL database). This is not limited herein. The plurality of transformation matrices, coordinates, and movement trajectories that are determined may be stored in this application. The blockchain is a new application mode of computer technologies such as distributed data storage, point-to-point transmission, a consensus mechanism, and an encryption algorithm. The blockchain is essentially a decentralized database, and is a string of data blocks generated through association by using a cryptography method. In the embodiments of this disclosure, each data block in the blockchain may store the plurality of transformation matrices, coordinates, and movement trajectories that are determined. The cloud storage is a new concept extended and developed from a cloud computing concept, and refers to aggregating, by using functions such as a cluster application, a mesh technology, and a distributed file storage system and by using application software or an application interface, a large quantity of storage devices (where the storage devices are also referred to as storage nodes) of different types in a network to work together, to jointly store the plurality of transformation matrices, coordinates, and movement trajectories that are determined.

One or more computing processes involved in the embodiments of this disclosure may be implemented based on a cloud computing technology in the field of cloud technologies, to improve computing efficiency.

The cloud technology is a hosting technology that unifies a series of resources such as hardware, software, and a network in a wide area network or a local area network to calculate, store, process, and share data. The cloud computing is a computing mode, and is a product of development and convergence of conventional computer and network technologies such as grid computing, distributed computing, parallel computing, utility computing, network storage technologies, virtualization, and load balance. The cloud computing distributes a computing task to a resource pool including a large quantity of computers, so that various application systems can obtain computing power, storage space, and information services based on requirements. A network providing a resource is referred to as a "cloud". The resource in the "cloud" can be infinitely extended, and can be obtained at any moment, used as required, extended at any moment, and paid for use.

The data processing method provided in the embodiments of this disclosure may include any one of the following methods:

(1) obtaining at least one calibration target image determined by a head display device in a process in which the head display device moves in a motion capture area, each calibration target image being shot by a camera of the head display device, and the head display device including at least one camera; determining at least one corner point from the at least one calibration target image, and determining projection coordinates of first coordinates of each corner point in a calibration target coordinate system to an image coordinate system in which the corner point is located; determining second coordinates of each corner point in the image coordinate system and an offset distance between the projection coordinates and the second coordinates of each corner point, and determining, based on the offset distance corresponding to each corner point, a first transformation matrix from an object coordinate system in which a motion capture object is located to a camera coordinate system corresponding to a first camera, the first camera being any camera included in the head display device, and the motion capture object being rigidly connected to the head display device; and determining, based on the first transformation matrix and a first movement trajectory of the motion capture object in a world coordinate system when the head display device moves within a preset time period, a second movement trajectory of the first camera in the world coordinate system within the preset time period, and adjusting a pose estimation parameter of the head display device based on the second movement trajectory.

(2) In the data processing method according to (1), the adjusting a pose estimation parameter of the head display device based on the second movement trajectory includes: obtaining a third movement trajectory of the first camera within the preset time period, the third movement trajectory being determined by the head display device based on the pose estimation parameter; and determining a trajectory error between the third movement trajectory and the second movement trajectory, and adjusting the pose estimation parameter based on the trajectory error between the third movement trajectory and the second movement trajectory.

(3) In the data processing method according to (1), the adjusting a pose estimation parameter of the head display device based on the second movement trajectory includes: obtaining a preset trajectory of the first camera within the preset time period; and determining a trajectory error between the preset trajectory and the second movement trajectory, and adjusting the pose estimation parameter based on the trajectory error between the preset trajectory and the second movement trajectory.

(4) In the data processing method according to any one of (1) to (3), the determining, projection coordinates of first coordinates of the corner point in a calibration target coordinate system to an image coordinate system in which the corner point is located includes: determining, based on the first coordinates of the corner point in the calibration target coordinate system, third coordinates of the corner point in a camera coordinate system corresponding to a camera that shoots the corner point; and determining, based on an internal parameter of the camera and the third coordinates, the projection coordinates of the first coordinates of the corner point to the image coordinate system in which the corner point is located.

(5) In the data processing method according to (4), the determining, based on the first coordinates of the corner point in the calibration target coordinate system, third coordinates of the corner point in a camera coordinate system corresponding to a camera that shoots the corner point includes: determining, based on a motion capture system, a second transformation matrix from the world coordinate system corresponding to the motion capture system to the object coordinate system in which the motion capture object is located when the calibration target image in which the corner point is located is shot; determining a third transformation matrix from the object coordinate system to the camera coordinate system corresponding to the camera that shoots the corner point and a fourth transformation matrix from the calibration target coordinate system to the world coordinate system; and determining, based on the second transformation matrix, the third transformation matrix, the fourth transformation matrix, and the first coordinates of the corner point in the calibration target coordinate system, the third coordinates of the corner point in the camera coordinate system corresponding to the camera that shoots the corner point; the third transformation matrix, the fourth transformation matrix, and the third coordinates being unknown quantities.

(6) In the data processing method according to (5), the determining a third transformation matrix from the object coordinate system to the camera coordinate system corresponding to the camera that shoots the corner point includes: in response to that the camera that shoots the corner point is the first camera, determining a preset transformation matrix as the third transformation matrix from the object coordinate system to the camera coordinate system corresponding to the camera that shoots the corner point; or in response to that the camera that shoots the corner point is not the first camera, determining a fifth transformation matrix from the camera coordinate system corresponding to the first camera to the camera coordinate system corresponding to the camera that shoots the corner point, and determining, based on the fifth transformation matrix and a preset transformation matrix, the third transformation matrix from the object coordinate system to the camera coordinate system corresponding to the camera that shoots the corner point; the preset transformation matrix being an unknown quantity.

(7) In the data processing method according to either of (5) and (6), the determining, based on the offset distance corresponding to each corner point, a first transformation matrix from an object coordinate system in which a motion capture object is located to a camera coordinate system corresponding to a first camera includes: determining a projection optimization function based on the offset distance corresponding to each corner point, the projection optimization function being configured for representing a sum of squares of the offset distance corresponding to each corner point; and determining, as the first transformation matrix from the object coordinate system in which the motion capture object is located to the camera coordinate system corresponding to the first camera, a third transformation matrix from the object coordinate system to the camera coordinate system corresponding to the first camera when a function value of the projection optimization function is minimum.

(8) In the data processing method according to any one of (5) to (7), the determining, based on a motion capture system, a second transformation matrix from the world coordinate system corresponding to the motion capture system to the object coordinate system in which the motion capture object is located when the calibration target image in which the corner point is located is shot includes: determining, based on the motion capture system, pose information of the motion capture object when the calibration target image in which the corner point is located is shot; and determining, based on the pose information of the motion capture object, the second transformation matrix from the world coordinate system corresponding to the motion capture system to the object coordinate system in which the motion capture object is located when the calibration target image in which the corner point is located is shot.

(9) In the data processing method according to (8), the determining, based on the motion capture system, pose information of the motion capture object when the calibration target image in which the corner point is located is shot includes: capturing a movement picture of the motion capture object in the motion capture area based on the motion capture system, and performing analysis based on the movement picture of the motion capture object, to obtain the pose information of the motion capture object when the calibration target image in which the corner point is located is shot.

(10) In the data processing method according to any one of (4) to (9), the internal parameter of the camera includes a focal-length parameter and an optical-center parameter.

(11) In the data processing method according to any one of (1) to (10), the determining first coordinates of the corner point in a calibration target coordinate system includes: determining a location of the corner point in a corresponding calibration target, a side length of each checkerboard in the calibration target image in which the corner point is located, and a gap between any two checkerboards; and determining the first coordinates of the corner point in the calibration target coordinate system based on the location of the corner point in the corresponding calibration target, the side length of each checkerboard in the calibration target image in which the corner point is located, and the gap between any two checkerboards.

(12) In the data processing method according to (11), the determining the first coordinates of the corner point in the calibration target coordinate system based on the location of the corner point in the corresponding calibration target, the side length of each checkerboard in the calibration target image in which the corner point is located, and the gap between any two checkerboards includes: determining, based on the location of the corner point in the corresponding calibration target, the side length of each checkerboard in the calibration target image in which the corner point is located, and the gap between any two checkerboards, a linear distance from the corner point to an x-axis of the calibration target coordinate system and a linear distance from the corner point to a y-axis of the calibration target coordinate system; and determining the first coordinates of the corner point in the calibration target coordinate system based on the linear distance from the corner point to the x-axis of the calibration target coordinate system and the linear distance from the corner point to the y-axis of the calibration target coordinate system.

(13) In the data processing method according to any one of (1) to (12), before the determining the first coordinates of the corner point in the calibration target coordinate system, the method further includes: determining the calibration target coordinate system in the calibration target image in which the corner point is located.

(14) In the data processing method according to any one of (1) to (13), the determining at least one corner point from the at least one calibration target image includes: performing binarization processing on each calibration target image based on a local average adaptive thresholding method, to obtain a first image, and performing image dilation processing on the first image, to obtain a second image; and performing quadrilateral detection on the second image, and determining a vertex of each quadrangle in the second image as a corner point.

(15) In the data processing method according to any one of (1) to (13), the determining at least one corner point from the at least one calibration target image includes: if each checkerboard in each calibration target image is a two-dimensional barcode, detecting at least one two-dimensional barcode in the calibration target image based on a two-dimensional barcode detection algorithm, and determining a vertex of each two-dimensional barcode in the calibration target image as a corner point.

(16) In the data processing method according to any one of (1) to (15), the determining an offset distance between the projection coordinates and the second coordinates of each corner point includes: determining, as the offset distance between the projection coordinates and the second coordinates of each corner point, a distance between the projection coordinates of each corner point and the second coordinates of each corner point in the image coordinate system.

When related data involved in the data processing method provided in the embodiments of this disclosure is applied to a specific product or technology, permission or consent of a related object needs to be obtained, and collection, use, and processing of the relevant data need to comply with relevant laws, regulations, and standards of relevant countries and regions.

Figure 13:
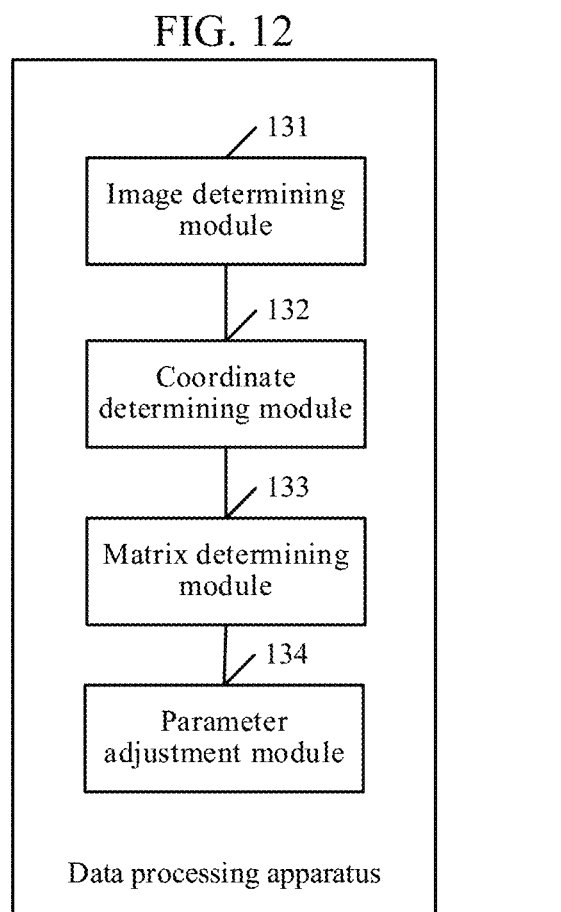
FIG. 13 is a schematic diagram of a structure of a data processing apparatus according to an embodiment of this disclosure.

FIG. 13 is a schematic diagram of a structure of a data processing apparatus according to an embodiment of this disclosure. The data processing apparatus provided in this embodiment of this disclosure includes:

an image determining module 131, configured to obtain at least one calibration target image determined by a head display device in a process in which the head display device moves in a motion capture area, each calibration target image being shot by a camera of the head display device, and the head display device including at least one camera;

a coordinate determining module 132, configured to determine at least one corner point from the at least one calibration target image, and determine projection coordinates of first coordinates of each corner point in a calibration target coordinate system to an image coordinate system in which the corner point is located;

a matrix determining module 133, configured to determine second coordinates of each corner point in the image coordinate system and an offset distance between the projection coordinates and the second coordinates of each corner point, and determine, based on the offset distance corresponding to each corner point, a first transformation matrix from an object coordinate system in which a motion capture object is located to a camera coordinate system corresponding to a first camera, the first camera being any camera included in the head display device, and the motion capture object being rigidly connected to the head display device; and a parameter adjustment module 134, configured to determine, based on the first transformation matrix and a first movement trajectory of the motion capture object in a world coordinate system when the head display device moves within a preset time period, a second movement trajectory of the first camera in the world coordinate system within the preset time period, and adjust a pose estimation parameter of the head display device based on the second movement trajectory.

In some embodiments, when adjusting the pose estimation parameter of the head display device based on the second movement trajectory, the parameter adjustment module 134 is configured to: obtain a third movement trajectory of the first camera within the preset time period, the third movement trajectory being determined by the head display device based on the pose estimation parameter; and determine a trajectory error between the third movement trajectory and the second movement trajectory, and adjust the pose estimation parameter based on the trajectory error.

In some embodiments, when adjusting the pose estimation parameter of the head display device based on the second movement trajectory, the parameter adjustment module 134 is configured to: obtain a preset trajectory of the first camera within the preset time period; and determine a trajectory error between the preset trajectory and the second movement trajectory, and adjust the pose estimation parameter based on the trajectory error between the preset trajectory and the second movement trajectory.

In some embodiments, when determining the projection coordinates of the first coordinates of the corner point in the calibration target coordinate system to the image coordinate system in which the corner point is located, the coordinate determining module 132 is configured to: determine, based on the first coordinates of the corner point in the calibration target coordinate system, third coordinates of the corner point in a camera coordinate system corresponding to a camera that shoots the corner point; and determine, based on an internal parameter of the camera and the third coordinates, the projection coordinates of the first coordinates of the corner point to the image coordinate system in which the corner point is located.

In some embodiments, when determining, based on the first coordinates of the corner point in the calibration target coordinate system, the third coordinates of the corner point in the camera coordinate system corresponding to the camera that shoots the corner point, the coordinate determining module 132 is configured to: determine, based on a motion capture system, a second transformation matrix from the world coordinate system corresponding to the motion capture system to the object coordinate system in which the motion capture object is located when the calibration target image in which the corner point is located is shot; determine a third transformation matrix from the object coordinate system to the camera coordinate system corresponding to the camera that shoots the corner point and a fourth transformation matrix from the calibration target coordinate system to the world coordinate system; and determine, based on the second transformation matrix, the third transformation matrix, the fourth transformation matrix, and the first coordinates of the corner point in the calibration target coordinate system, the third coordinates of the corner point in the camera coordinate system corresponding to the camera that shoots the corner point; the third transformation matrix, the fourth transformation matrix, and the third coordinates being unknown quantities.

In some embodiments, when determining the third transformation matrix from the object coordinate system to the camera coordinate system corresponding to the camera that shoots the corner point, the coordinate determining module 132 is configured to: in response to that the camera that shoots the corner point is the first camera, determine a preset transformation matrix as the third transformation matrix from the object coordinate system to the camera coordinate system corresponding to the camera that shoots the corner point; or in response to that the camera that shoots the corner point is not the first camera, determine a fifth transformation matrix from the camera coordinate system corresponding to the first camera to the camera coordinate system corresponding to the camera that shoots the corner point, and determine, based on the fifth transformation matrix and a preset transformation matrix, the third transformation matrix from the object coordinate system to the camera coordinate system corresponding to the camera that shoots the corner point; the preset transformation matrix being an unknown quantity.

In some embodiments, when determining, based on the offset distance corresponding to each corner point, the first transformation matrix from the object coordinate system in which the motion capture object is located to the camera coordinate system corresponding to the first camera, the matrix determining module 133 is configured to: determine a projection optimization function based on the offset distance corresponding to each corner point, the projection optimization function being configured for representing a sum of squares of the offset distance corresponding to each corner point; and determine, as the first transformation matrix from the object coordinate system in which the motion capture object is located to the camera coordinate system corresponding to the first camera, a third transformation matrix from the object coordinate system to the camera coordinate system corresponding to the first camera when a function value of the projection optimization function is minimum.

In some embodiments, when determining, based on the motion capture system, the second transformation matrix from the world coordinate system corresponding to the motion capture system to the object coordinate system in which the motion capture object is located when the calibration target image in which the corner point is located is shot, the coordinate determining module 132 is configured to: determine, based on the motion capture system, pose information of the motion capture object when the calibration target image in which the corner point is located is shot; and determine, based on the pose information of the motion capture object, the second transformation matrix from the world coordinate system corresponding to the motion capture system to the object coordinate system in which the motion capture object is located when the calibration target image in which the corner point is located is shot.

In some embodiments, when determining, based on the motion capture system, the pose information of the motion capture object when the calibration target image in which the corner point is located is shot, the coordinate determining module 132 is configured to: capture a movement picture of the motion capture object in the motion capture area based on the motion capture system, and perform analysis based on the movement picture of the motion capture object, to obtain the pose information of the motion capture object when the calibration target image in which the corner point is located is shot.

In some embodiments, the internal parameter of the camera includes a focal-length parameter and an optical-center parameter.

In some embodiments, when determining, for each corner point, the first coordinates of the corner point in the calibration target coordinate system, the coordinate determining module 132 is configured to: determine a location of the corner point in a corresponding calibration target, a side length of each checkerboard in the calibration target image in which the corner point is located, and a gap between any two checkerboards; and determine the first coordinates of the corner point in the calibration target coordinate system based on the location of the corner point in the corresponding calibration target, the side length of each checkerboard in the calibration target image in which the corner point is located, and the gap between any two checkerboards.

In some embodiments, when determining the first coordinates of the corner point in the calibration target coordinate system based on the location of the corner point in the corresponding calibration target, the side length of each checkerboard in the calibration target image in which the corner point is located, and the gap between any two checkerboards, the coordinate determining module 132 is configured to: determine, based on the location of the corner point in the corresponding calibration target, the side length of each checkerboard in the calibration target image in which the corner point is located, and the gap between any two checkerboards, a linear distance from the corner point to an x-axis of the calibration target coordinate system and a linear distance from the corner point to a y-axis of the calibration target coordinate system; and determine the first coordinates of the corner point in the calibration target coordinate system based on the linear distance from the corner point to the x-axis of the calibration target coordinate system and the linear distance from the corner point to the y-axis of the calibration target coordinate system.

In some embodiments, before determining the first coordinates of the corner point in the calibration target coordinate system, the coordinate determining module 132 is further configured to determine the calibration target coordinate system in the calibration target image in which the corner point is located.

In some embodiments, when determining the at least one corner point from the at least one calibration target image, the coordinate determining module 132 is configured to: perform binarization processing on each calibration target image based on a local average adaptive thresholding method, to obtain a first image, and perform image dilation processing on the first image, to obtain a second image; and perform quadrilateral detection on the second image, and determine a vertex of each quadrangle in the second image as a corner point.

In some embodiments, when determining the at least one corner point from the at least one calibration target image, the coordinate determining module 132 is configured to: if each checkerboard in each calibration target image is a two-dimensional barcode, detect at least one two-dimensional barcode in the calibration target image based on a two-dimensional barcode detection algorithm, and determine a vertex of each two-dimensional barcode in the calibration target image as a corner point.

In some embodiments, when determining the offset distance between the projection coordinates and the second coordinates of each corner point, the matrix determining module 133 is configured to: determine, as the offset distance between the projection coordinates and the second coordinates of each corner point, a distance between the projection coordinates of each corner point and the second coordinates of each corner point in the image coordinate system.

During specific implementation, the data processing apparatus may perform implementations provided in the operations in FIG. 2 by using built-in functional modules of the data processing apparatus. For details, refer to the implementations provided in the operations, and details are not described herein again.

Figure 14:
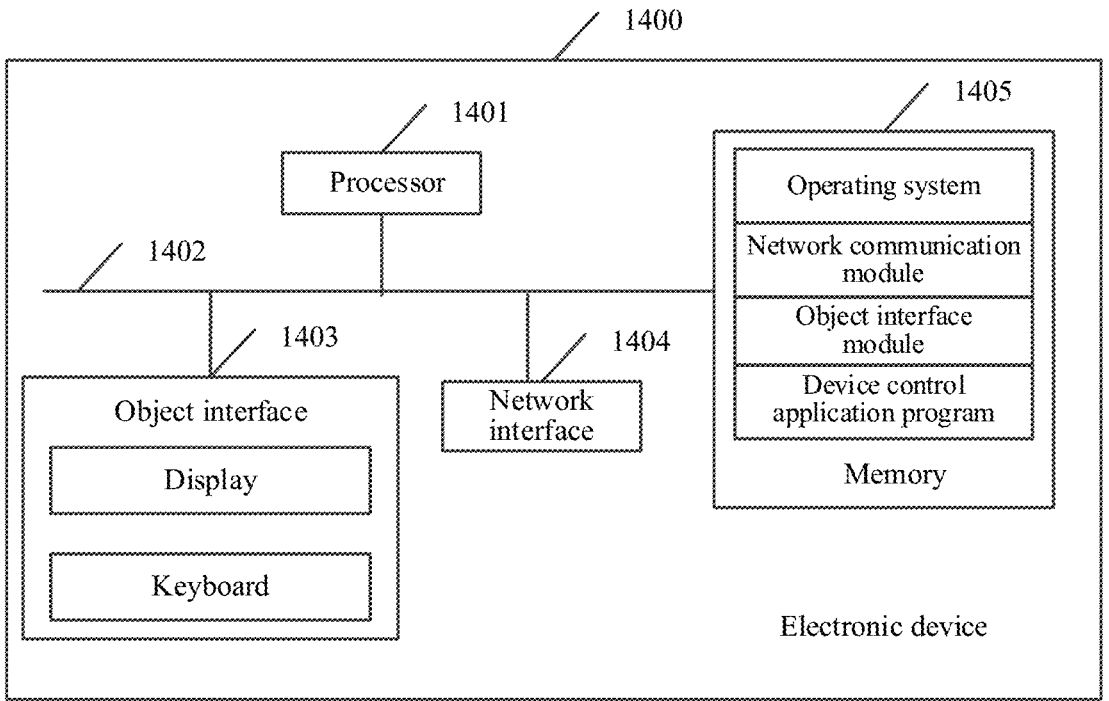
FIG. 14 is a schematic diagram of a structure of an electronic device according to an embodiment of this disclosure.

FIG. 14 is a schematic diagram of a structure of an electronic device according to an embodiment of this disclosure. As shown in FIG. 14, an electronic device 1400 in this embodiment may include a processor 1401, a network interface 1404, and a memory 1405. In addition, the electronic device 1400 may further include an object interface 1403 and at least one communication bus 1402. The communication bus 1402 is configured to implement connection communication between the components. The object interface 1403 may include a display and a keyboard. In some embodiments, the object interface 1403 may further include a standard wired interface and a standard wireless interface. In some embodiments, the network interface 1404 may include a standard wired interface and a standard wireless interface (such as a Wi-Fi interface). The memory 1405 may be a high-speed random access memory (RAM) memory, or may be a non-volatile memory (NVM), for example, at least one magnetic disk memory. In some embodiments, the memory 1405 may alternatively be at least one storage apparatus away from the foregoing processor 1401. As shown in FIG. 14, as a computer-readable storage medium, the memory 1405 may include an operating system, a network communication module, an object interface module, and a device control application program.

In the electronic device 1400 shown in FIG. 14, the network interface 1404 may provide a network communication function. The object interface 1403 is mainly configured to provide an input interface for an object. Processing circuitry, such as the processor 1401, may be configured to invoke the device control application program stored in the memory 1405, to implement the following operations:

obtaining at least one calibration target image determined by a head display device in a process in which the head display device moves in a motion capture area, each calibration target image being shot by a camera of the head display device, and the head display device including at least one camera; determining at least one corner point from the at least one calibration target image, and determining projection coordinates of first coordinates of each corner point in a calibration target coordinate system to an image coordinate system in which the corner point is located; determining second coordinates of each corner point in the image coordinate system and an offset distance between the projection coordinates and the second coordinates of each corner point, and determining, based on the offset distance corresponding to each corner point, a first transformation matrix from an object coordinate system in which a motion capture object is located to a camera coordinate system corresponding to a first camera, the first camera being any camera included in the head display device, and the motion capture object being rigidly connected to the head display device; and determining, based on the first transformation matrix and a first movement trajectory of the motion capture object in a world coordinate system when the head display device moves within a preset time period, a second movement trajectory of the first camera in the world coordinate system within the preset time period, and adjusting a pose estimation parameter of the head display device based on the second movement trajectory.

In some embodiments, the processor 1401 is configured to: obtain a third movement trajectory of the first camera within the preset time period, the third movement trajectory being determined by the head display device based on the pose estimation parameter; and determine a trajectory error between the third movement trajectory and the second movement trajectory, and adjust the pose estimation parameter based on the trajectory error between the third movement trajectory and the second movement trajectory.

In some embodiments, the processor 1401 is configured to obtain a preset trajectory of the first camera within the preset time period; and determine a trajectory error between the preset trajectory and the second movement trajectory, and adjust the pose estimation parameter based on the trajectory error between the preset trajectory and the second movement trajectory.

In some embodiments, for each corner point, the processor 1401 is configured to: determine, based on the first coordinates of the corner point in the calibration target coordinate system, third coordinates of the corner point in a camera coordinate system corresponding to a camera that shoots the corner point; and determine, based on an internal parameter of the camera and the third coordinates, the projection coordinates of the first coordinates of the corner point to the image coordinate system in which the corner point is located.

In some embodiments, for each corner point, the processor 1401 is configured to: determine, based on a motion capture system, a second transformation matrix from the world coordinate system corresponding to the motion capture system to the object coordinate system in which the motion capture object is located when the calibration target image in which the corner point is located is shot; determine a third transformation matrix from the object coordinate system to the camera coordinate system corresponding to the camera that shoots the corner point and a fourth transformation matrix from the calibration target coordinate system to the world coordinate system; and determine, based on the second transformation matrix, the third transformation matrix, the fourth transformation matrix, and the first coordinates of the corner point in the calibration target coordinate system, the third coordinates of the corner point in the camera coordinate system corresponding to the camera that shoots the corner point; the third transformation matrix, the fourth transformation matrix, and the third coordinates being unknown quantities.

In some embodiments, for each corner point, the processor 1401 is configured to: in response to that the camera that shoots the corner point is the first camera, determine a preset transformation matrix as the third transformation matrix from the object coordinate system to the camera coordinate system corresponding to the camera that shoots the corner point; or in response to that the camera that shoots the corner point is not the first camera, determine a fifth transformation matrix from the camera coordinate system corresponding to the first camera to the camera coordinate system corresponding to the camera that shoots the corner point, and determine, based on the fifth transformation matrix and a preset transformation matrix, the third transformation matrix from the object coordinate system to the camera coordinate system corresponding to the camera that shoots the corner point; the preset transformation matrix being an unknown quantity.

In some embodiments, the processor 1401 is configured to: determine a projection optimization function based on the offset distance corresponding to each corner point, the projection optimization function being configured for representing a sum of squares of the offset distance corresponding to each corner point; and determine, as the first transformation matrix from the object coordinate system in which the motion capture object is located to the camera coordinate system corresponding to the first camera, a third transformation matrix from the object coordinate system to the camera coordinate system corresponding to the first camera when a function value of the projection optimization function is minimum.

In some embodiments, for each corner point, the processor 1401 is configured to: determine, based on the motion capture system, pose information of the motion capture object when the calibration target image in which the corner point is located is shot; and determine, based on the pose information of the motion capture object, the second transformation matrix from the world coordinate system corresponding to the motion capture system to the object coordinate system in which the motion capture object is located when the calibration target image in which the corner point is located is shot.

In some embodiments, for each corner point, the processor 1401 is configured to: capture a movement picture of the motion capture object in the motion capture area based on the motion capture system, and perform analysis based on the movement picture of the motion capture object, to obtain the pose information of the motion capture object when the calibration target image in which the corner point is located is shot.

In some embodiments, the internal parameter of the camera includes a focal-length parameter and an optical-center parameter.

In some embodiments, for each corner point, the processor 1401 is configured to: determine a location of the corner point in a corresponding calibration target, a side length of each checkerboard in the calibration target image in which the corner point is located, and a gap between any two checkerboards; and determine the first coordinates of the corner point in the calibration target coordinate system based on the location of the corner point in the corresponding calibration target, the side length of each checkerboard in the calibration target image in which the corner point is located, and the gap between any two checkerboards.

In some embodiments, the processor 1401 is configured to: determine, based on the location of the corner point in the corresponding calibration target, the side length of each checkerboard in the calibration target image in which the corner point is located, and the gap between any two checkerboards, a linear distance from the corner point to an x-axis of the calibration target coordinate system and a linear distance from the corner point to a y-axis of the calibration target coordinate system; and determine the first coordinates of the corner point in the calibration target coordinate system based on the linear distance from the corner point to the x-axis of the calibration target coordinate system and the linear distance from the corner point to the y-axis of the calibration target coordinate system.

In some embodiments, the processor 1401 is configured to determine the calibration target coordinate system in the calibration target image in which the corner point is located.

In some embodiments, the processor 1401 is configured to: perform binarization processing on each calibration target image based on a local average adaptive thresholding method, to obtain a first image, and perform image dilation processing on the first image, to obtain a second image; and perform quadrilateral detection on the second image, and determine a vertex of each quadrangle in the second image as a corner point.

In some embodiments, the processor 1401 is configured to: if each checkerboard in each calibration target image is a two-dimensional barcode, detect at least one two-dimensional barcode in the calibration target image based on a two-dimensional barcode detection algorithm, and determine a vertex of each two-dimensional barcode in the calibration target image as a corner point.

In some embodiments, the processor 1401 is configured to: determine, as the offset distance between the projection coordinates and the second coordinates of each corner point, a distance between the projection coordinates of each corner point and the second coordinates of each corner point in the image coordinate system.

In some implementations, the processor 1401 may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like. The memory may include a read-only memory and a random access memory, and provides instructions and data for the processor. A part of the memory may further include a non-volatile random access memory. For example, the memory may further store information about a device type.

During specific implementation, the electronic device 1400 may perform implementations provided in the operations in FIG. 2 by using built-in functional modules of the electronic device 1400. For details, refer to the implementations provided in the operations, and details are not described herein again.

An embodiment of this disclosure further provides a computer-readable storage medium, such as a non-transitory computer-readable storage medium. The computer-readable storage medium stores a computer program, and the computer program is executed by a processor to implement the method provided in the operations in FIG. 2. For details, refer to the implementations provided in the operations, and details are not described herein again.

The computer-readable storage medium may be an internal storage unit in the data processing apparatus or the electronic device provided in any one of the foregoing embodiments, for example, a hard disk or an internal memory of the electronic device. The computer-readable storage medium may alternatively be an external storage device of the electronic device, for example, a plug-in hard disk disposed in the electronic device, a smart memory card (SMC), a security digital (SD) card, or a flash card. The computer-readable storage medium may further include a magnetic disk, an optical disc, a read-only memory, a random access memory, or the like. Further, the computer-readable storage medium may alternatively include both an internal storage unit and an external storage device of the electronic device. The computer-readable storage medium is configured to store a computer program and another program and data required by the electronic device. The computer-readable storage medium may be further configured to temporarily store data that has been outputted or that is to be outputted.

An embodiment of this disclosure provides a computer program product, including a computer program. When the computer program is executed by a processor, the method provided in the operations in FIG. 2 is implemented.

The terms "first", "second", and the like in the claims, the specification, and the accompanying drawings of this disclosure are intended to distinguish between different objects, instead of describing a particular sequence. In addition, the terms "including", "having", or any other variant thereof are intended to cover a non-exclusive inclusion. For example, a process, a method, a system, a product, or an electronic device including a series of steps or units is not limited to the listed steps or units, but instead, in some embodiments, includes steps or units that are not listed, or in some embodiments, includes other steps or units inherent to the process, method, product, or electronic device. Reference in this specification to "an embodiment" means that a specified feature, structure, or characteristic described with reference to the embodiment may be included in at least one embodiment of this disclosure. The phrase presented in various locations in the specification may not necessarily refer to a same embodiment, and is not an independent or alternative embodiment exclusive from another embodiment. It is explicitly and implicitly understood by a person skilled in the art that embodiments described in this specification may be combined with another embodiment. The term "and/or" used in the specification and the appended claims of this disclosure refers to any and all possible combinations of one or more of associated listed items, and includes these combinations.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

A person of ordinary skill in the art may be aware that, in combination with the examples described in the embodiments disclosed in this specification, units and algorithm steps may be implemented by electronic hardware or a combination of computer software and electronic hardware. To clearly describe interchangeability between the hardware and the software, compositions and operations of each example are generally described in the foregoing descriptions based on functions. A person skilled in the art may implement the described function by using different methods for each particular application, but such implementation is not to be considered to go beyond the scope of this disclosure.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Examples of embodiments of this disclosure are disclosed above, and are not intended to limit the scope of the claims of this disclosure.

What is claimed is:

1. A data processing method, comprising:
obtaining at least one calibration target image captured by a camera of a head mounted display device in a process in which the head mounted display device moves in a motion capture area;
determining at least one corner point from the at least one calibration target image;

determining projection coordinates of first coordinates of each of the at least one corner point in a calibration target coordinate system to an image coordinate system in which the respective corner point is located;

determining second coordinates of each of the at least one corner point in the image coordinate system and an offset distance between the projection coordinates and the second coordinates of the respective corner point;

determining, based on the offset distance corresponding to each of the at least one corner point, a first transformation matrix from an object coordinate system in which a motion capture object is located to a camera coordinate system corresponding to the camera, the motion capture object being attached to the head mounted display device;

determining, based on the first transformation matrix and a first movement trajectory of the motion capture object in a world coordinate system when the head mounted display device moves within a preset time period, a second movement trajectory of the camera in the world coordinate system within the preset time period; and adjusting a pose estimation parameter of the head mounted display device based on the second movement trajectory.

2. The method according to claim 1, wherein the adjusting the pose estimation parameter comprises:

obtaining a third movement trajectory of the camera within the preset time period, the third movement trajectory being determined by the head mounted display device based on the pose estimation parameter;

determining a trajectory error between the third movement trajectory and the second movement trajectory; and adjusting the pose estimation parameter based on the trajectory error between the third movement trajectory and the second movement trajectory.

3. The method according to claim 1, wherein the adjusting the pose estimation parameter comprises:

obtaining a preset trajectory of the camera within the preset time period;

determining a trajectory error between the preset trajectory and the second movement trajectory; and adjusting the pose estimation parameter based on the trajectory error between the preset trajectory and the second movement trajectory.

4. The method according to claim 1, wherein the determining the projection coordinates comprises:

determining, based on the first coordinates of the corner point in the calibration target coordinate system, third coordinates of the corner point in the camera coordinate system corresponding to the camera that shoots the corner point; and determining, based on an internal parameter of the camera and the third coordinates, the projection coordinates of the first coordinates of the corner point to the image coordinate system in which the corner point is located.

5. The method according to claim 4, wherein the determining the third coordinates comprises:

determining, based on a motion capture system, a second transformation matrix from the world coordinate system corresponding to the motion capture system to the object coordinate system in which the motion capture object is located when the calibration target image in which the corner point is located is captured;

determining a third transformation matrix from the object coordinate system to the camera coordinate system corresponding to the camera that shoots the corner point and a fourth transformation matrix from the calibration target coordinate system to the world coordinate system; and determining, based on the second transformation matrix, the third transformation matrix, the fourth transformation matrix, and the first coordinates of the corner point in the calibration target coordinate system, the third coordinates of the corner point in the camera coordinate system corresponding to the camera that shoots the corner point, wherein the third transformation matrix, the fourth transformation matrix, and the third coordinates are unknown quantities.

6. The method according to claim 5, wherein the determining the third transformation matrix comprises:

when the camera captured the corner point is the first camera, determining a preset transformation matrix as the third transformation matrix from the object coordinate system to the camera coordinate system corresponding to the camera that shoots the corner point; and when the head mounted display device includes a plurality of cameras that are configured to capture the at least one calibration target image and the corner point is captured by another camera of the plurality of cameras that is different from the camera, determining a fifth transformation matrix from the camera coordinate system corresponding to the camera to the camera coordinate system corresponding to the another camera that shoots the corner point, and determining, based on the fifth transformation matrix and a preset transformation matrix, the third transformation matrix from the object coordinate system to the camera coordinate system corresponding to the another camera that shoots the corner point; and the preset transformation matrix is an unknown quantity.

7. The method according to claim 5, wherein the determining the first transformation matrix comprises:

determining a projection optimization function based on the offset distance corresponding to each of the at least one corner point, the projection optimization function representing a sum of squares of the offset distance corresponding to each of the at least one corner point; and determining, as the first transformation matrix from the object coordinate system in which the motion capture object is located to the camera coordinate system corresponding to the first camera, a third transformation matrix from the object coordinate system to the camera coordinate system corresponding to the first camera when a function value of the projection optimization function is minimum.

8. The method according to claim 5, wherein the determining the second transformation matrix comprises:

determining, based on the motion capture system, pose information of the motion capture object when the calibration target image in which the corner point is located is captured; and determining, based on the pose information of the motion capture object, the second transformation matrix from the world coordinate system corresponding to the motion capture system to the object coordinate system in which the motion capture object is located when the calibration target image in which the corner point is located is captured.

9. The method according to claim 8, wherein the determining the pose information comprises:

capturing a movement picture of the motion capture object in the motion capture area based on the motion capture system; and performing analysis based on the movement picture of the motion capture object, to obtain the pose information of the motion capture object when the calibration target image in which the corner point is located is captured.

10. The method according to claim 4, wherein the internal parameter of the camera includes a focal-length parameter and an optical-center parameter.

11. The method according to claim 1, wherein the determining the first coordinates of the corner point comprises:

determining a location of the corner point in a corresponding calibration target, a side length of each checkerboard in the calibration target image in which the corner point is located, and a gap between any two checkerboards; and determining the first coordinates of the corner point in the calibration target coordinate system based on the location of the corner point in the corresponding calibration target, the side length of each checkerboard in the calibration target image in which the corner point is located, and the gap between any two checkerboards.

12. The method according to claim 11, wherein the determining the first coordinates of the corner point in the calibration target coordinate system comprises:

determining, based on the location of the corner point in the corresponding calibration target, the side length of each checkerboard in the calibration target image in which the corner point is located, and the gap between any two checkerboards, a linear distance from the corner point to an x-axis of the calibration target coordinate system and a linear distance from the corner point to a y-axis of the calibration target coordinate system; and determining the first coordinates of the corner point in the calibration target coordinate system based on the linear distance from the corner point to the x-axis of the calibration target coordinate system and the linear distance from the corner point to the y-axis of the calibration target coordinate system.

13. The method according to claim 11, further comprising:

determining the calibration target coordinate system in the calibration target image in which the corner point is located.

14. The method according to claim 1, wherein the determining the at least one corner point comprises:

performing binarization processing on each of the at least one calibration target image based on a local average adaptive thresholding method, to obtain a respective first image, and performing image dilation processing on the respective first image, to obtain a respective second image; and performing quadrilateral detection on the respective second image, and determining a vertex of each quadrangle in the respective second image as a corner point of the respective calibration target image.

15. The method according to claim 1, wherein the determining at least one corner point comprises:

when each checkerboard in a calibration target image of the at least one calibration target image is a two-dimensional barcode, detecting at least one two-dimensional barcode in the calibration target image based on a two-dimensional barcode detection algorithm, and determining a vertex of each two-dimensional barcode in the calibration target image as the corner point of the calibration target image.

16. The method according to claim 1, wherein the determining the offset distance comprises:

determining, as the offset distance between the projection coordinates and the second coordinates of each of the at least one corner point, a distance between the projection coordinates of the respective corner point and the second coordinates of the respective corner point in the image coordinate system.

17. A data processing apparatus, comprising:

processing circuitry configured to:

obtain at least one calibration target image captured by a camera of a head mounted display device in a process in which the head mounted display device moves in a motion capture area;

determine at least one corner point from the at least one calibration target image;

determine projection coordinates of first coordinates of each of the at least one corner point in a calibration target coordinate system to an image coordinate system in which the respective corner point is located;

determine second coordinates of each of the at least one corner point in the image coordinate system and an offset distance between the projection coordinates and the second coordinates of the respective corner point;

determine, based on the offset distance corresponding to each of the at least one corner point, a first transformation matrix from an object coordinate system in which a motion capture object is located to a camera coordinate system corresponding to the camera, the motion capture object being attached to the head mounted display device;

determine, based on the first transformation matrix and a first movement trajectory of the motion capture object in a world coordinate system when the head mounted display device moves within a preset time period, a second movement trajectory of the camera in the world coordinate system within the preset time period; and adjust a pose estimation parameter of the head mounted display device based on the second movement trajectory.

18. The data processing apparatus according to claim 17, wherein the processing circuitry is configured to:

obtain a third movement trajectory of the camera within the preset time period, the third movement trajectory being determined by the head mounted display device based on the pose estimation parameter;

determine a trajectory error between the third movement trajectory and the second movement trajectory; and adjust the pose estimation parameter based on the trajectory error between the third movement trajectory and the second movement trajectory.

19. The data processing apparatus according to claim 17, wherein the processing circuitry is configured to:

obtain a preset trajectory of the camera within the preset time period;

determine a trajectory error between the preset trajectory and the second movement trajectory; and adjust the pose estimation parameter based on the trajectory error between the preset trajectory and the second movement trajectory.

20. A non-transitory computer-readable storage medium, storing instructions which when executed by at least one processor cause the at least one processor to perform:

obtaining at least one calibration target image captured by a camera of a head mounted display device in a process in which the head mounted display device moves in a motion capture area;

determining at least one corner point from the at least one calibration target image;

determining projection coordinates of first coordinates of each of the at least one corner point in a calibration target coordinate system to an image coordinate system in which the respective corner point is located;

determining second coordinates of each of the at least one corner point in the image coordinate system and an offset distance between the projection coordinates and the second coordinates of the respective corner point;

determining, based on the offset distance corresponding to each of the at least one corner point, a first transformation matrix from an object coordinate system in which a motion capture object is located to a camera coordinate system corresponding to the camera, the motion capture object being attached to the head mounted display device;

determining, based on the first transformation matrix and a first movement trajectory of the motion capture object in a world coordinate system when the head mounted display device moves within a preset time period, a second movement trajectory of the camera in the world coordinate system within the preset time period; and adjusting a pose estimation parameter of the head mounted display device based on the second movement trajectory.

\* \* \* \* \*